US012412070B2

(12) United States Patent
Min et al.

(10) Patent No.: US 12,412,070 B2
(45) Date of Patent: Sep. 9, 2025

(54) NEURAL PROCESSING UNIT THAT REUSES FEATURE MAPS AND ITS OPERATION METHOD

(71) Applicant: DEEPX CO., LTD., Seongnam-si (KR)

(72) Inventors: Dong Hyun Min, Goyang-si (KR); Jung Boo Park, Seoul (KR); Kyeong Han Kim, Yongin-si (KR); Ho Seung Kim, Suwon-si (KR); Hyun Jin Kim, Hwaseong-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/636,196

(22) Filed: Apr. 15, 2024

(65) Prior Publication Data

US 2025/0181884 A1 Jun. 5, 2025

(30) Foreign Application Priority Data

Nov. 30, 2023 (KR) .................... 10-2023-0171760

(51) Int. Cl.
*G06N 3/04* (2023.01)
*G06F 3/06* (2006.01)
*G06N 3/063* (2023.01)

(52) U.S. Cl.
CPC ............ *G06N 3/04* (2013.01); *G06F 3/0604* (2013.01); *G06N 3/063* (2013.01)

(58) Field of Classification Search
CPC ...................................................... G06N 3/04
See application file for complete search history.

(56) References Cited

U.S. PATENT DOCUMENTS

| 2019/0164037 A1* | 5/2019 | Kim ...................... G06N 3/04 |
| 2019/0187963 A1* | 6/2019 | Bokhari ................. G06F 8/35 |
| 2020/0234147 A1* | 7/2020 | Kim ..................... G06N 3/045 |
| 2021/0174177 A1* | 6/2021 | Yu ....................... G06N 3/045 |

FOREIGN PATENT DOCUMENTS

| TW | 202324203 A | 6/2023 |
| TW | 202333052 A | 8/2023 |

OTHER PUBLICATIONS

TW Office Action dated Jul. 30, 2025 issued on Application No. 113146653.

* cited by examiner

*Primary Examiner* — David R Vincent
(74) *Attorney, Agent, or Firm* — Invenstone Patent LLC.

(57) ABSTRACT

A method of reusing feature maps that is operable on a neural processing unit (NPU) includes calculating, for a first layer of at least one artificial neural network (ANN) model, a space cost based on sizes of an input feature map, an output feature map, and a weight of a subsequent layer of the first layer; calculating a caching value for an operation of the first layer; determining a caching profit for the operation of the first layer based on the space cost and the caching value; determining a caching entry having maximum caching profit among caching candidate entries; and storing the caching entry in a variable memory. A system including the NPU includes a main memory to store a portion of the ANN model; a variable memory to selectively store a caching entry of the portion of the ANN model; and a controller to perform the method.

17 Claims, 24 Drawing Sheets

| Idx | Data(Value) |
|-----|-------------|
| 0   |             |
| 1   |             |
| 2   | $OF_1(15)$  |
| 3   |             |
| 4   |             |
| 5   |             |
| 6   |             |
| 7   |             |
| 8   |             |
| 9   |             |
| 10  |             |
| 11  |             |
| 12  |             |
| 13  |             |
| 14  |             |
| 15  |             |
| 16  |             |
| 17  |             |

SRAM
(After Layer 1 Processing)

FIG. 7

| Idx | Data(Value) |
|---|---|
| 0 | |
| 1 | |
| 2 | $OF_1(10)$ |
| 3 | |
| 4 | |
| 5 | |
| 6 | |
| 7 | |
| 8 | |
| 9 | $OF_2(9)$ |
| 10 | |
| 11 | |
| 12 | |
| 13 | |
| 14 | |
| 15 | |
| 16 | |
| 17 | |

SRAM
(After Layer 2 Processing)

FIG. 8

| Idx | Data(Value) |
|---|---|
| 0 | |
| 1 | |
| 2 | |
| 3 | |
| 4 | |
| 5 | $OF_2(9)$ |
| 6 | |
| 7 | |
| 8 | |
| 9 | |
| 10 | |
| 11 | |
| 12 | |
| 13 | |
| 14 | $OF_5(12)$ |
| 15 | |
| 16 | |
| 17 | |

SRAM
(After Layer 5 Processing)

DRAM: $OF_4(9)$, $OF_3(9)$

FIG. 11

| Idx | Data(Value) |
|-----|-------------|
| 0   |             |
| 1   |             |
| 2   | $OF_1(15)$  |
| 3   |             |
| 4   |             |
| 5   |             |
| 6   |             |
| 7   |             |
| 8   |             |
| 9   |             |
| 10  |             |
| 11  |             |
| 12  |             |
| 13  |             |
| 14  |             |
| 15  |             |
| 16  |             |
| 17  |             |

SRAM
(After Layer 1 Processing)

FIG. 13

| Idx | Data(Value) |
|---|---|
| 0 | |
| 1 | |
| 2 | $OF_1(5)$ |
| 3 | |
| 4 | |
| 5 | |
| 6 | |
| 7 | |
| 8 | $OF_4(6)$ |
| 9 | |
| 10 | |
| 11 | |
| 12 | |
| 13 | |
| 14 | |
| 15 | |
| 16 | |
| 17 | |

SRAM
(After Layer 4 Processing)

$OF_2(9)$

DRAM

FIG. 16

NEURAL PROCESSING UNIT THAT REUSES FEATURE MAPS AND ITS OPERATION METHOD

CROSS-REFERENCE TO RELATED APPLICATIONS

This application claims the priority of Korean Patent Application No. 10-2023-0171760 filed on Nov. 30, 2023, in the Korean Intellectual Property Office, the disclosure of which is incorporated herein by reference.

BACKGROUND OF THE DISCLOSURE

Technical Field

The present disclosure relates to a neural processing unit that reuses feature maps and a method of operating the same.

Background Art

Humans are equipped with intelligence that can perform recognition, classification, inference, prediction, and control/decision making. Artificial intelligence (AI) refers to artificially mimicking human intelligence.

The human brain is composed of a multitude nerve cells called neurons. Each neuron is connected to hundreds to thousands of other neurons through connections called synapses. The modeling of the operating principle of biological neurons and the connection relationship between neurons to imitate human intelligence is called an artificial neural network (ANN) model. In other words, ANN is a system in which nodes that imitate neurons are connected in a layer structure.

In addition, neural processing units (NPUs) have recently been developed to accelerate the computational speed of artificial intelligence (AI).

SUMMARY OF THE DISCLOSURE

Neural network models are categorized into "single-layer neural networks" and "multi-layer neural networks" based on the number of layers. A typical multilayer neural network consists of an input layer, a hidden layer, and an output layer. The input layer is the layer that accepts input data. The hidden layer is located between the input and output layers and receives signals from the input layer, extracts features, and passes them to the output layer. The output layer is the layer that receives signals from the hidden layer and generates an output.

There are several types of deep neural networks (DNNs), which increase the number of hidden layers to achieve higher artificial intelligence in multi-layer neural networks. On the other hand, a convolutional neural network (CNN) is known for its ability to extract features from input data and identify patterns in the extracted features.

There are many types of artificial neural network (ANN) models depending on the purpose of the AI service. For example, if the input data is an image or video, a convolutional neural network (CNN) model can be used for image classification, object detection, object tracking, and the like of the input image for AI services.

CNN-based neural network models can be processed with convolutional operations, activation function operations, pooling operations, stride operations, batch-normalization operations, skip-connection operations, concatenation operations, quantization operations, clipping operations, padding operations, and the like selected according to the architecture of the neural network.

Some of the layers of a neural network model may be connected in series with each other. Some of the layers of a neural network model may be branched in parallel to each other. Some of the layers of the artificial neural network model may be connected in parallel to each other. Some of the branches of the respective layers of the artificial neural network model may be joined together.

For example, in each layer of a convolutional neural network (CNN), the input feature map corresponding to the input data or the kernel corresponding to the weights may be a matrix consisting of a plurality of channels. When the convolution operation of the input feature map and the kernel is performed, an output feature map is generated as a result of the convolution operation on each channel, and an activation map of the corresponding channel is generated by applying an activation function to the output feature map. Pooling may then be applied to the activation map. The activation map may be collectively referred to herein as the output feature map.

The inventors of the present disclosure have also researched a neural processing unit (NPU), which is a processor of an artificial neural network memory system optimized for processing the artificial neural network models.

The neural processing unit (NPU) may be configured to include respective processing circuits optimized for convolutional operations, activation function operations, pooling operations, stride operations, batch normalization operations, skip connection operations, concatenation operations, quantization operations, clipping operations, and padding operations required for the above-described artificial neural network operations.

More specifically, the inventors of the present disclosure have also researched neural processing unit (NPU) memory systems optimized for processing convolutional neural network (CNN) models, visual transformer models, and the like.

A neural processing unit (NPU) may include processing elements that perform multiply-accumulate (MAC) operations and memory to store data required for MAC operations. The memory of the neural processing unit (NPU) may need to store input feature maps, weights, and/or output feature maps. The input feature map or output feature map may be referred to as an activation value.

On the other hand, the hardware for implementing the neural processing unit (NPU) may be an artificial intelligence-specific application specific integrated circuit (ASIC). The inventors of the present disclosure recognize that an artificial intelligence-specific ASIC may have a limited chip area in which memory is formed, in order to provide a chip area in which processing elements are formed.

In particular, the inventors of the present disclosure have recognized that by reducing the memory capacity of a neural processing unit implemented in an ASIC dedicated to artificial intelligence, the production cost of an ASIC dedicated to artificial intelligence can be reduced and the productivity of an ASIC dedicated to artificial intelligence can be improved.

However, the inventors of the present disclosure recognized that as the memory capacity of a dedicated ASIC for AI decreases, there is less space to store feature maps and weights in the dedicated ASIC, and that feature maps and weights need to be tiled in main memory at a more frequent rate.

Furthermore, the inventors of the present disclosure have recognized that as the amount of data transfer between the ASIC dedicated to AI and the main memory increases, the required power of the system increases dramatically, the overhead of the DMA due to the number and frequency of direct memory access (DMA) operations increases, and the delay of the operations performed inside the neural processing unit increases.

Accordingly, the inventors of the present disclosure recognize that the key to optimizing neural network memory usage is to cache various data (e.g., output feature maps) in a memory (e.g., variable memory) close to the computing core (i.e., a plurality of processing elements) during the computation of an artificial neural network model and to efficiently reuse the cached feature maps in the next computation, i.e., to minimize access to the main memory.

Accordingly, the inventors of the present disclosure recognize that caching algorithms used in von Neumann structures (e.g., LRU, FIFO, LFU) are difficult to adopt in the computation of neural processing units because they do not take into account dynamic factors such as the size of the available space inside the variable memory that changes over time and the time-varying gain when caching the output feature map of each layer.

In addition, the inventors of the present disclosure recognized that neural network models have a directed acyclic graph (DAG) algorithmic structure, rather than a simple chain-structured algorithm, and that neural processing units require customized caching strategies.

An object of the present disclosure is to provide a neural processing unit (NPU) that caches a feature map in a variable memory and reuses the feature map for computation, and a method of operating the NPU.

Another object of the present disclosure is to provide an NPU and a method of operating the NPU that can minimize computation delay and DMA overhead by determining caching entry for each operation using a delta-step caching algorithm (Δ being a positive integer) that takes into account the characteristics of variable memory.

However, the objects of the present disclosure are not limited to those mentioned above, and other objects will be apparent to those of ordinary skill in the art from the following description.

According to examples of the present disclosure, a method of reusing feature maps that is operable on a neural processing unit (NPU) may include calculating, for a first layer of at least one artificial neural network (ANN) model, a space cost based on sizes of an input feature map, an output feature map, and a weight of a subsequent layer of the first layer, calculating a caching value for an operation of the first layer, determining a caching profit for the operation of the first layer based on the space cost and the caching value, determining a caching entry having maximum caching profit among caching candidate entries, and storing the caching entry in a variable memory.

The space cost may be a number of buffers of the variable memory corresponding to a sum of a size of the output feature map of the first layer and the sizes of the output feature map and the weight of the subsequent layer. The space cost may be calculated based on a tiling method of the first layer, and the tiling method may include copy, swap, and/or move.

The caching value may be a size of data corresponding to a performance profit obtained when the output feature map of the first layer is stored in the variable memory.

The caching candidate entries may include at least one output feature map to be used for a layer computation at a particular instance, and the caching entry may include at least one selected output feature map from the caching candidate entries. The caching entry may be determined based on a computational order of each layer in the at least one ANN model and on sizes of the input feature map and the output feature map of each layer in the caching candidate entries.

If the space cost is less than or equal to the size of the variable memory, the caching profit of the operation of the first layer may be determined by the larger value of a first caching profit when the output feature map of the first layer is stored in the variable memory and a second caching profit when the output feature map of the first layer is not stored in the variable memory.

On the other hand, if the space cost is larger than the size of the variable memory, the caching profit of the operation of the first layer may be determined by the caching profit when the output feature map of the first layer is not stored in the variable memory. The caching profit may be determined for each layer included in the at least one ANN model.

According to examples of the present disclosure, a system including a neural processing unit may include a main memory configured to store at least a portion of data of at least one artificial neural network (ANN) model, a variable memory configured to selectively store a caching entry of the at least a portion of the data of the at least one ANN model in at least one memory unit of a plurality of memory units; and a controller. The controller may be configured to calculate, for a first layer of the at least one ANN model, a space cost based on sizes of an input feature map, an output feature map, and a weight for each layer within a delta-step layer (Δ-step layer), where Δ is an integer greater than or equal to two; calculate a caching value for an operation of the first layer, determine a caching profit for the operation of the first layer based on the space cost and the caching value, and determine a caching entry having maximum caching profit among caching candidate entries.

A path between the first layer and the delta-step layer may include Δ-1 layers.

The space cost may be a number of buffers of the variable memory corresponding to a sum of a size of the output feature map of the first layer and the sizes of the output feature map and the weight of the subsequent layer.

The caching value may be a size of data corresponding to a performance profit obtained when the output feature map of the first layer is stored in the variable memory.

The caching candidate entries may include at least one output feature map to be used for a layer computation at a particular instance, and the caching entry may include at least one selected output feature map from the caching candidate entries.

The controller may be further configured to determine the caching entry among the caching candidate entries using a dynamic programming-based algorithm.

The system including a neural processing unit may further include a direct memory access (DMA) circuitry configured to control memory operations between the main memory and the variable memory, and an artificial intelligence (AI) compute unit configured to process an artificial neural network inference operation by receiving the input feature map and the weight from the variable memory.

The system including a neural processing unit may further include at least one processing element configured to perform a convolutional operation on the input feature map and the weight.

The output feature map of the variable memory may be reused by a machine code in which the at least one ANN model is compiled, such that power consumption of the system including a neural processing unit is lower than a conventional technology without feature map reuse technique.

The output feature map of the variable memory may be reused by a machine code in which the at least one ANN model is compiled, such that inference operation processing time of the system is faster than a conventional technology without feature map reuse technique.

Details of other examples are included in the detailed description and drawings.

According to the present disclosure, by applying a caching algorithm that considers the structure of the artificial neural network and the characteristics of the variable memory, the feature map can be reused efficiently, the operation and overhead of the DMA can be minimized, and the operation delay can be minimized.

According to the present disclosure, by using a delta-step caching algorithm (Δ being a positive integer) to calculate the caching profit of the variable memory for each operation, and to determine the caching entry with the maximum caching profit, the access to the main memory of the neural processing unit can be minimized.

According to the present disclosure, by controlling the data stored in the internal memory variably, it is possible to improve memory utilization in terms of caching profit, as well as to avoid storing unnecessary data that is not included in the caching entry by considering the layer(s) up to the delta-step.

According to the present disclosure, maximum storage efficiency can be achieved with minimal memory size, which can provide better cache performance.

According to the present disclosure, access to the main memory can be minimized and the internal memory size can be optimized, thereby reducing the power consumption of the neural processing unit and reducing the processing time of inference operations.

Furthermore, by eliminating the need to inefficiently increase the memory size in a neural processing unit including the internal memory of the present disclosure, the manufacturing yield of an ASIC chip can be increased.

The effects of the present disclosure are not limited by the above examples, and many more effects are included in the present disclosure.

BRIEF DESCRIPTION OF THE DRAWINGS

FIGS. 7 to 11 are diagrams respectively illustrating internal configurations of main memory and variable memory while determining caching entry for the graph of FIG. 6 when delta-step is one.

FIGS. 13 to 17 are diagrams respectively illustrating internal configurations of a main memory and a variable memory while determining a caching entry when the delta-step is three for the graph of FIG. 6.

DETAILED DESCRIPTION OF THE EMBODIMENT

Figure 1:
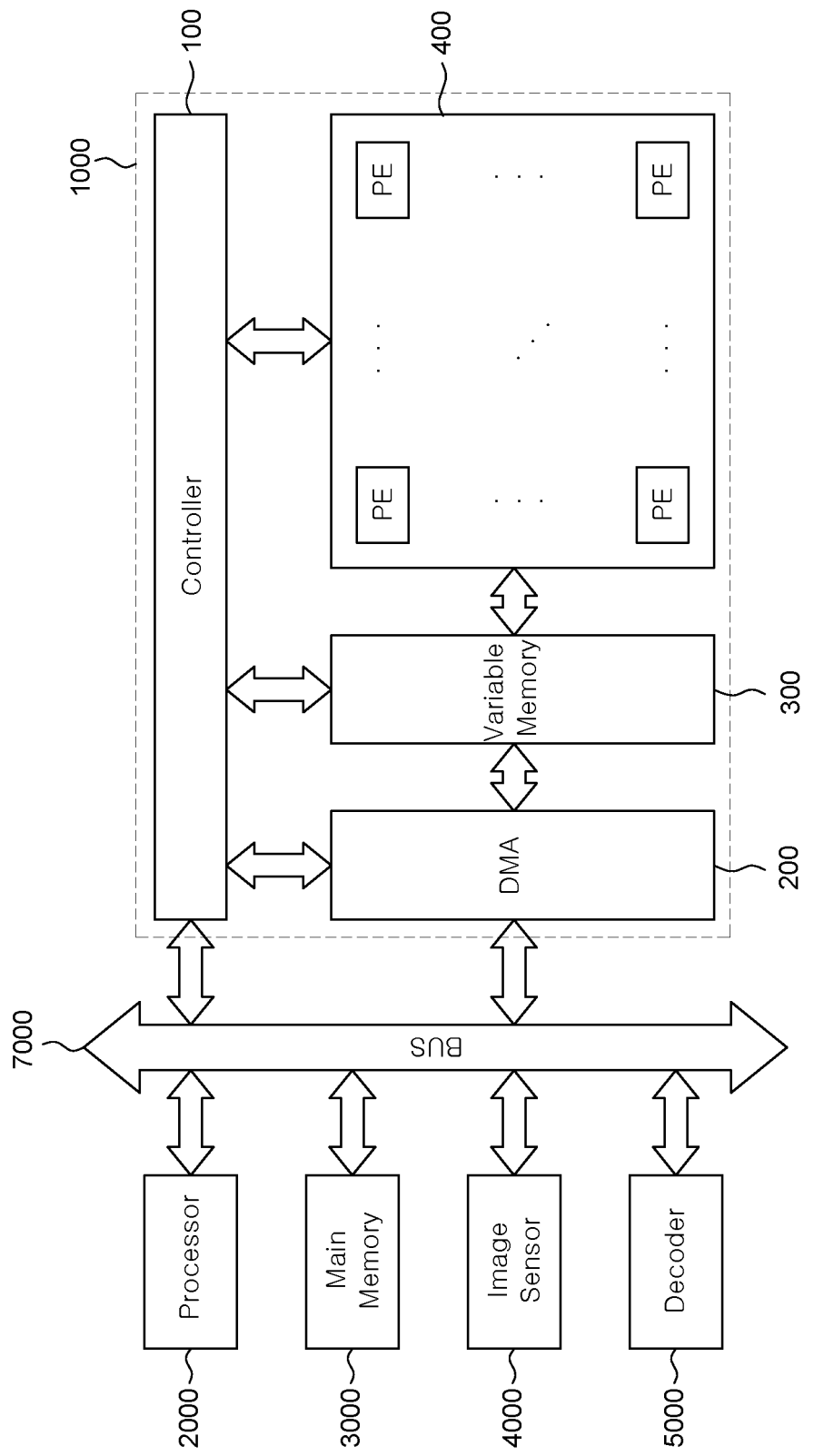
FIG. 1 is a schematic conceptual diagram illustrating a neural processing unit including a variable memory, according to one example of the present disclosure.

Certain structural or step-by-step descriptions of embodiments according to the concepts of the present disclosure disclosed in this specification or application are illustrated by way of example only for the purpose of describing embodiments according to the concepts of the present disclosure.

Embodiments according to the concepts of the present disclosure may be practiced in a variety of forms, and embodiments according to the concepts of the present disclosure may be practiced in a variety of forms and should not be construed to be limited to the embodiments described in this specification or application.

Since embodiments according to the concepts of the present disclosure may be subject to various modifications and may take many forms, certain embodiments are illustrated in the drawings and described in detail in the specification or application. However, this is not intended to limit the embodiments according to the concepts of the present disclosure to any particular disclosed form, and should be understood to include all modifications, equivalents, or substitutions that are within the scope of the ideas and techniques of the present disclosure.

Terms such as first and/or second may be used to describe various elements, but said elements should not be limited by said terms.

These terms are used solely for the purpose of distinguishing one element from another, e.g., a first element may be named as a second element, and similarly a second element may be named as a first element, without departing from the scope of the rights under the concepts of the present disclosure.

When an element is referred to as being "connected" or "connected to" another element, it is to be understood that it may be directly connected or connected to the other element, but that there may be other elements in between. On the other hand, when a element is said to be "directly connected" or "directly attached" to another element, it should be understood that there are no other elements in between.

Other expressions that describe relationships between elements, such as "between" and "directly between" or "adjacent to" and "directly adjacent to" should be interpreted similarly.

In the present disclosure, expressions such as "A or B," "at least one of A and/or B." or "one or more of A or/and B" may include all possible combinations thereof. For example, "A or B," "at least one of A and B," or "at least one of A or B" may refer to both (1) including at least one A, (2) including at least one B, or (3) including both at least one A and at least one B.

As used in this disclosure, expressions such as "first," "second," "first," or "second," may refer to various elements, in any order and/or order of importance, and are used to distinguish one element from another and are not intended to limit such elements. For example, a first user device and a second user device may refer to different user devices, in any order or order of importance. For example, without departing from the scope of the claims herein, the first element may be referred to as the second element, and similarly, the second element may be referred to interchangeably as the first element.

The terms used in this disclosure are intended only to describe certain embodiments and are not intended to limit the scope of other examples.

The singular expression may include the plural unless the context clearly indicates otherwise. Terms used herein, including technical or scientific terms, are intended to have the same meaning as commonly understood by one of ordinary skill in the art described herein.

Terms used in this disclosure that have common dictionary definitions are intended to have the same or similar meanings as they have in the context of the relevant art and are not intended to be interpreted in an idealized or overly formal sense unless expressly defined herein. In some cases, terms defined herein should not be construed to exclude embodiments of the present disclosure.

The terms used in this disclosure are used to describe specific embodiments only and are not intended to limit the present disclosure.

The singular expression includes the plural unless the context clearly indicates otherwise. In this specification, the terms "include" or "have" and the like are intended to designate the presence of the described features, numbers, steps, actions, elements, parts, or combinations thereof, and are not intended to preclude the possibility of the presence or addition of one or more other features, numbers, steps, actions, elements, parts, or combinations thereof.

Unless otherwise defined, all terms used herein, including technical or scientific terms, shall have the same meaning as commonly understood by one of ordinary skill in the technical field to which this disclosure belongs. Such terms, as defined in commonly used dictionaries, are to be construed to have meanings consistent with their contextual meaning in the relevant art and are not to be construed in an idealized or unduly formal sense unless expressly defined herein.

The features of each of the various examples of the present disclosure may be combined or combined with each other in part or in whole, and may be technically interlocked and operated in a variety of ways as will be appreciated by those skilled in the art, and each example may be practiced independently of or in conjunction with each other.

In describing each example, technical details that are well known in the art and not directly related to the present disclosure are omitted. This is done to make the disclosure clearer without obscuring the main points of the disclosure by omitting unnecessary explanations.

Examples of the present disclosure are hereinafter described in more detail with reference to the accompanying drawings.

FIG. 1 illustrates a neural processing unit including a variable memory, according to one example of the present disclosure.

FIG. 1 further illustrates a plurality of peripherals for operation of the neural processing unit. Accordingly, the neural processing unit and the plurality of peripherals may be referred to as a system. At least some element(s) of the system may comprise a system on a chip (SoC).

Referring to FIG. 1, a neural processing unit (NPU) 1000 may be configured to perform various artificial neural network inference functions in communication with a processor 2000, a main memory 3000, an image sensor 4000, and a decoder 5000.

Each of the neural processing unit 1000, processor 2000, main memory 3000, image sensor 4000, or decoder 5000 may be formed as an independent circuit, but the configuration is not limited thereto. Each of the elements described above is categorized by its operational function, and each may be implemented on a circuit board, silicon substrate, resistors, transistors, or the like. As such, each is a semiconductor circuit with numerous transistors connected, some of which may be difficult to identify and distinguish with the naked eye, and may be identified only by their functions. Accordingly, each of the elements of FIG. 1 may be referred to as a circuit.

Each of the processor 2000, main memory 3000, image sensor 4000, and decoder 5000 described above may communicate via a bus 7000 to send and receive data to and from the neural processing unit 1000. According to one example of the present disclosure, the bus 7000 may be an advanced extensible interface (AXI) bus. However, without limitation, the neural processing unit 1000 may also be configured to be directly connected to at least one of the elements described above.

The neural processing unit 1000 may be defined as a processor specialized for the operation of an artificial neural network model. In particular, the neural processing unit 1000 may be specialized for convolutional computation, which accounts for the majority of computation in the neural network model.

The neural processing unit 1000 may include a controller 100, a direct memory access (DMA) 200, a variable memory 300, and at least one processing element 400. In addition, the neural processing unit 1000 may include other function units. For example, although not shown, processing elements 400 may be further configured to include respective processing circuits optimized for activation function operations, pooling operations, stride operations, batch normalization operations, skip connection operations, concatenation operations, quantization operations, deconvolution operations, clipping operations, and padding operations. For example, although not shown, processing element 400 may be electrically connected and communicate with respective processing circuits optimized for activation function operations, pooling operations, stride operations, batch normalization operations, skip connection operations, concatenation operations, quantization operations, deconvolution operations, clipping operations, and padding operations. Each of the additional processing circuits may be referred to as a special functional unit.

The controller 100 may be configured to control the behavior of each of the DMA 200, the variable memory 300, and the plurality of processing elements 400 in connection with computing the artificial neural network model. The controller 100 may be in communication with each of the DMA 200, the variable memory 300, and the plurality of processing elements 400, either directly or indirectly. The controller 100 can adjust the capacity of each domain of the variable memory 300 based on the capacity of the variable memory 30. Representative domains of data processed in an artificial neural network model may include input feature maps, output feature maps, and weights. Variable memory 300 may also be referred to as cache memory or internal memory. The plurality of processing elements 400 or processing elements (PEs) may also be referred to as artificial intelligence (AI) compute units.

The DMA 200 may be configured to allow the neural processing unit 1000 to directly access and read and/or write to the main memory 3000 of the neural processing unit 1000. The neural processing unit 1000 may read various data associated with the artificial neural network model from the main memory 3000 via the DMA 200. The main memory 3000 may be embedded in a system-on-chip (SoC) or configured as a separate memory device.

Variable memory 300 may be a memory disposed in an on-chip area of neural processing unit 1000 and may be an internal memory for caching or storing data processed in the on-chip area. The variable memory 300 may read and store at least some of the data required for computing the neural network model from the main memory 3000. The variable memory 300 may be configured to store all or a portion of the artificial neural network model depending on the memory capacity settings for each domain and the data size per layer of the neural network model.

Specifically, the variable memory 300 may read and store an input feature map corresponding to input data from the main memory 3000 and/or a kernel corresponding to weights for convolutional computation of the input feature map. Further, the variable memory 300 may read and store an output feature map, which is the result of performing a convolution of the input feature map and the weights, from the plurality of processing elements 400. Meanwhile, the variable memory 300 may include at least one of memories such as ROM, SRAM, DRAM, resistive RAM, magneto-resistive RAM, phase-change RAM, ferroelectric RAM, flash memory, HBM, and the like. According to one example of the present disclosure, the variable memory 300 may be SRAM, and being configured as SRAM is advantageous in terms of computational processing speed. Further, the variable memory 300 may comprise at least one memory unit. The variable memory 300 may comprise homogeneous memory units or heterogeneous memory units, i.e., each memory unit of the variable memory 300 may store any one of an input feature map, a weight, and an output feature map.

The data stored in the memory units of the variable memory 300 may not be fixed to one of the input feature map, the weight, and the output feature map, but may be varied to another of the input feature map, the weight, and the output feature map as needed. In other words, by varying the memory allocation of the variable memory 300, the usage efficiency of the variable memory 300 may be improved. In other words, the size of the data for each domain stored by the variable memory 300 may vary for each computation step.

The plurality of processing elements 400 may be configured to perform multiplication and accumulation (MAC) operations. However, the disclosure is not limited to this, and the plurality of processing elements 400 according to various examples of the disclosure may be modified with at least one processing element.

The plurality of processing elements 400 may each be configured to receive and compute an input feature map and/or a kernel corresponding to weights for input data of the artificial neural network.

The processing element (PE) may be configured to perform functions such as addition, multiplication, accumulation, and the like required for processing the neural network model. The processing element (PE) may include a multiply and accumulate (MAC) operator, an arithmetic logic unit (ALU) operator, and the like.

Exemplarily, the processing element (PE) may receive an input feature map and weights, perform a convolutional operation, and output an output feature map. That is, the output feature map may be a convolutional result, but examples of the present disclosure are not limited thereto, and the output feature map may include an activation function operation, a pooling operation, a stride operation, a batch-normalization operation, a skip-connection operation, a concatenation operation, a quantization operation, a clipping operation, a padding operation, and the like, optionally further applied to the convolutional result.

The controller 100 may recognize an area, location, address, or the like where the output feature map stored in the variable memory 300 is stored. Accordingly, the controller 100 may control the variable memory 300 such that the output feature map stored in the variable memory 300 is reused as an input feature map in the subsequent layer of computation.

The main memory 3000 may store data required for the computation of the neural network model. The main memory 3000 may comprise any one of memories such as ROM, SRAM, DRAM, resistive RAM, magneto-resistive RAM, phase-change RAM, ferroelectric RAM, flash memory, HBM, and the like, but is advantageously configured as DRAM for data storage capacity. The main memory 3000 may comprise at least one memory unit. The main memory 3000 may comprise a homogeneous memory unit or a heterogeneous memory unit.

The main memory 3000 may store at least one artificial neural network model. The main memory 3000 may be provided with the weights of at least a portion of the at least one layer of an artificial neural network model to be processed by a neural processing unit 1000. The neural processing unit 1000 may be configured to alternately process different neural network models.

The neural network model processed by the neural processing unit 1000 may be a deep neural network model. Accordingly, the deep neural network model may include a plurality of layers, each of which may include a respective feature map and a respective weight.

An artificial neural network model according to one example of the present disclosure may need to take into account dynamic factors such as a time-varying available size of a variable memory, or a time-varying profit when caching the output feature maps of each layer.

An artificial neural network model according to one example of the present disclosure may be a directed acyclic graph (DAG) algorithm rather than a simple chain algorithm.

Therefore, when caching various data (e.g., output feature maps) in a variable memory proximate to the computation core (i.e., the plurality of processing elements 400) for efficient reuse in the next computation, a customized caching strategy is required to take into account the DAG algorithmic structure and dynamic factors of the artificial neural network model.

For example, a caching strategy that determines whether it is beneficial or detrimental to cache the output feature maps of a particular layer operation from a global perspective, rather than a simple caching strategy such as deciding to cache the output feature maps of a particular layer operation so that they can be used in the subsequent layer, is required.

According to one example of the present disclosure, a delta-step caching algorithm can be used as a caching strategy. The delta-step caching algorithm may be a multi-staged sum of subset maximization heuristic algorithm that iterates at each point in time when the caching profit of caching the feature map changes.

For example, an algorithm that determines the caching entry or entries that yield the maximum caching profit by considering the subsequent layer of the first layer when computing the first layer, i.e., a delta-step caching algorithm with a A-step of one (i.e., a one-step caching algorithm), can be used.

The "subsequent layer" of the first layer means the layer where the output feature map of the first layer is input as the input feature map and the layer directly connected in the graph.

The meaning of considering the subsequent layer of the first layer in the computation of the first layer is, for example, assuming that the output feature map of the first layer has been cached, and determining in advance whether the subsequent layer can be computed using the memory available in the variable memory, and deciding whether to cache the output feature map of the first layer. In other words, a one-step caching algorithm means an algorithm that determines a caching entry by considering whether the operations within the first boundary of the first layer to the subsequent layer are possible according to the variable memory capacity.

As another example, an algorithm that determines caching entry for maximum caching profit by considering the subsequent layer of the first layer as well as the subsequent layer of the subsequent layer during the first layer operation can be used, i.e., a delta-step caching algorithm with a delta-step of two (i.e., a two-step caching algorithm).

What is meant by considering the subsequent layer of the first layer as well as the subsequent layer of the subsequent layer when computing the first layer is that, for example, assuming the output feature map of the first layer has been cached, the caching is performed by determining in advance whether the subsequent layer can be computed using the memory available in the variable memory and whether the subsequent layer of the subsequent layer can be computed, and then determining whether to cache the output feature map of the first layer, or a combination that produces the maximum caching profit. In other words, a two-step caching algorithm means an algorithm that determines caching entry by considering whether operations within a second boundary to the subsequent layer of the first layer and the subsequent layer of the subsequent layer of the first layer are feasible based on a variable memory capacity. The image sensor 4000 may generate an image or image data of light entering through the lens, and the generated image or image data may be used as an input feature map for the artificial neural network model. The image sensor 4000 may be at least one, and may be configured to have multiple image sensors, for example, in the case of a robot, drone, autonomous vehicle, or the like.

Decoder 5000 may decode feature maps or weights of an encoded bit stream, and the decoded input feature maps or weights may be used as input to an artificial neural network model. The bit stream may be a bit stream corresponding to an MPEG standard, wherein the MPEG standard may be, for example, MPEG-VCM (video coding for machine) or MPEG-NNC (neural network compression).

Figure 2:
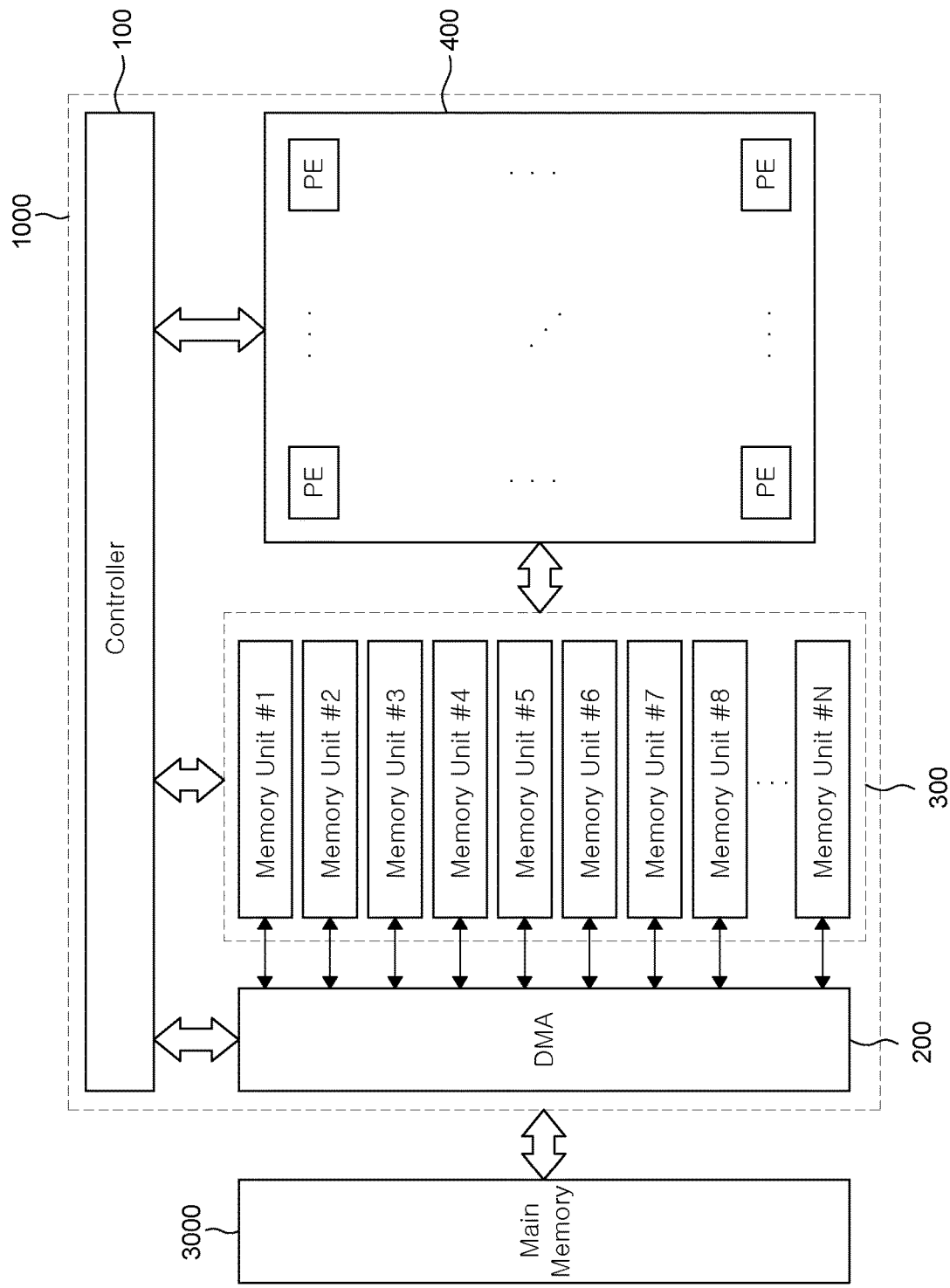
FIG. 2 is a block diagram illustrating the configuration and operation of a variable memory included in a neural processing unit according to one example of the present disclosure.

Referring now to FIG. 2, a configuration of a variable memory included in a neural processing unit will be described. In FIG. 2, only the variable memory and the plurality of processing elements included in the neural processing unit are illustrated for ease of explanation. However, a configuration of the variable memory included in the neural processing unit will be described below with reference to the elements shown in FIG. 1.

FIG. 2 illustrates the configuration and operation of a variable memory included in a neural processing unit according to one example of the present disclosure.

Referring to FIG. 2, the variable memory 300 may include a first memory unit Memory Unit #1 and a second memory unit Memory Unit #N. According to examples of the present disclosure, each memory unit of the variable memory 300 may be referred to as a "memory bank."

At least one of the N memory units may store one of an input feature map, an output feature map, or a weight. The set of memory unit(s) in which the input feature map or output feature map is stored in the variable memory 300 may be referred to as the "feature map memory." In the variable memory 300, the set of memory unit(s) in which the input feature map is stored may be referred to as the "input feature map memory," and the set of memory unit(s) in which the output feature map is stored in the variable memory 300 may be referred to as the "output feature map memory." The set of memory unit(s) in which weights are stored in the variable memory 300 may be referred to as the "weight memory." For example, the input feature map memory may be referred to as a memory of first domain data. The output feature map memory may be referred to as a memory of second domain data. The weight memory may be referred to as the memory of the third domain data.

For each layer of the artificial neural network model, the ratio of the capacity of the weight memory and the capacity of the feature map memory to the variable memory may vary, that is, the number of at least one memory unit included in the weight memory may vary and the number of at least one memory unit included in the feature map memory may vary for each layer of the artificial neural network model. In other words, the neural processing unit 1000 may set the number of units of the weight memory and the feature map memory in response to the characteristics of each layer of the artificial neural network model.

The size of each memory unit of the variable memory 300 may be configured to be equal to each other. For example, the capacity of each memory unit of the variable memory 300 may be configured as 1 KByte, 2 KByte, 4 KByte, 8 KByte, 16 KByte, 32 KByte, 64 KByte, 128 KByte, 256 KByte, 512 KByte, or 1,024 KByte. However, examples of the present disclosure are not limited to the above capacities of the memory unit.

The size of each memory unit of the variable memory 300 can be configured individually. For example, each memory unit of the variable memory 300 may have the same or different capacities. For example, some memory units may have a capacity of 4 KByte, while other memory units may have a capacity of 32 KByte. However, examples of the present disclosure are not limited to this capacity of the memory units.

Optimal computation scheduling based on the variable memory 300 may mean that the utilization rate of the variable memory 300 may be maximized for each layer of the neural network model. In particular, the smaller the capacity of the variable memory 300, the more the utilization rate affects the processing performance of the neural processing unit 1000. In the present disclosure, optimal computation scheduling means determining the optimal caching entries such that the caching profit is maximized for each layer computation from a global perspective. Maximizing the utilization of the variable memory 300 when caching candidates for the output feature map has the effect of maximizing the amount of data cached in the main memory 3000. This has the effect of reducing the data transfer frequency between the variable memory 300 and the main memory 3000.

When the total capacity of the variable memory 300 is less than the data size of the weights and feature maps of one layer that the neural processing unit 1000 wants to process, it may be necessary to tile the weights or feature maps. In such cases, maximizing the utilization rate of the variable memory 300 may have the effect of minimizing the number of tiles processed by the neural processing unit 1000.

The controller 100 may set the capacity of each of the weight memory, the input feature map memory, and the output feature map memory to be equal to each other in the first computation step of a particular artificial neural network model, that is, the number of at least one memory unit comprising the weight memory, the number of at least one memory unit comprising the input feature map memory, and the number of at least one memory unit comprising the output feature map memory in the first computation step may be set to be equal.

In the second computation step following the first computation step, the capacities of each of the weight memory, the input feature map memory, and the output feature map memory included in the variable memory 300 may be set differently, that is, the number of at least one memory unit comprising the weight memory, the number of at least one memory unit comprising the input feature map memory, and the number of at least one memory unit comprising the output feature map memory may be different in the second computation step.

A computational step may refer to a step in which the plurality of processing elements 400 of the neural processing unit 1000 process certain input feature map data and certain weight data stored in the at least one memory unit of the variable memory 300. For example, the first computational step may be a computation of a first layer of an artificial neural network model. The second computational step may be a computation of a second layer of the neural network model.

In another example, the first computation step may be a computation of a first tile of a first layer of the neural network model. The second computation step may be a computation of a second tile of the first layer of the neural network model. The compiler may be configured to determine a number of tiles for each layer based on a memory size of the variable memory 300 of the neural processing unit 1000 and a data size of the weights and features map of a particular layer of the neural network model.

The size of the feature maps and weights for each layer of the neural network model may be predefined. Thus, when the neural processing unit 1000 processes a particular neural network model, the neural processing unit 1000 may schedule operations of the neural processing unit 1000 based on information about the size of the feature maps and weights for each layer of the neural network model.

The controller 100 may be configured to control the DMA 200 and the variable memory 300 based on the analyzed computation scheduling information. The controller 100 may be configured to control the DMA 200 so that the DMA 200 controls the variable memory.

To process a particular neural network model, the compiler of the neural processing unit 1000 may optimally schedule operations based on the structure of the neural network model and the real-time variable capacity of the variable memory 300 for each domain of the available memory.

In particular, when the information of the processing order of the layers of the neural network model, the size of the feature map and weights for each layer is provided, the neural processing unit 1000 can predetermine how to allocate the capacity of the weight memory and the capacity of the feature map memory. Thus, the neural processing unit 1000 may operate according to a determined scheduling order and may not perform separate operations for scheduling to allocate capacity for the weights and feature maps of the variable memory 300. Thus, the operation of the variable memory 300 of the neural processing unit 1000 may be optimized based on information analyzing the weight size and feature map size of each layer of the neural network model. Here, the analyzed information may be included in the machine code compiling the artificial neural network model.

Figure 3:
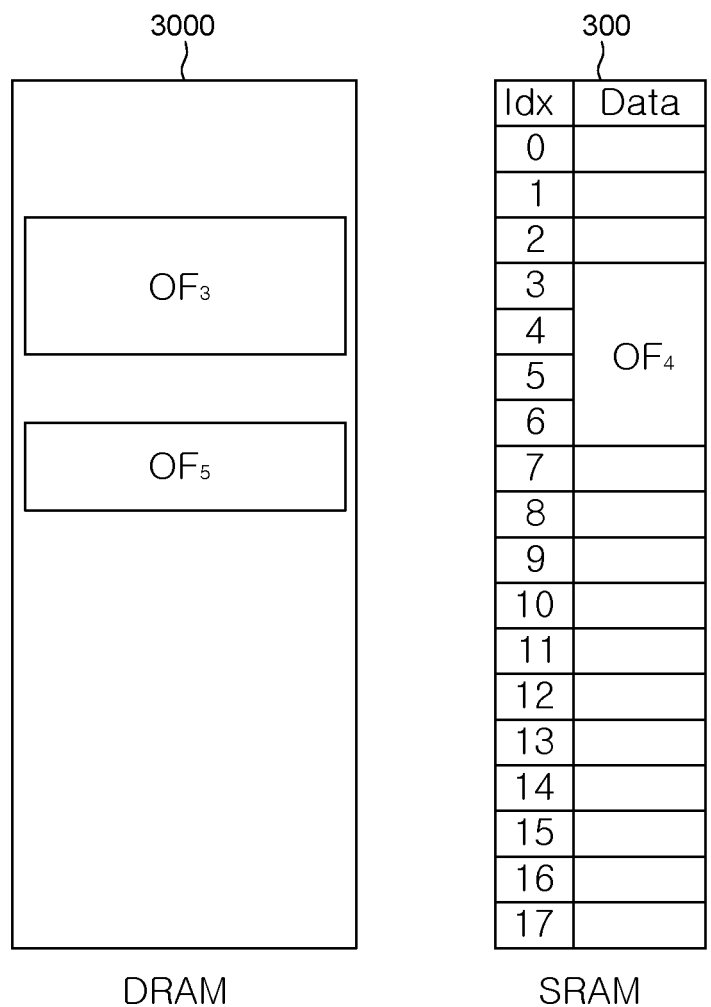
FIG. 3 is a diagram illustrating the internal organization of variable memory and main memory included in a neural processing unit according to one example of the present disclosure.

FIG. 3 illustrates the internal organization of variable memory and main memory included in a neural processing unit according to one example of the present disclosure.

Referring to FIG. 3, the variable memory 300 may be SRAM including eighteen memory banks, and the main memory 3000 may be DRAM. Variable memory 300 may include data indexed from 0 to 17, where each portion of data may be indexed in units of memory units.

Variable memory 300 or main memory 3000 may store data (e.g., input feature maps, output feature maps, and weights) required for computing the neural network model.

For example, the main memory 3000 may store the output feature map $OF_3$ of the third layer and the output feature map $OF_5$ of the fifth layer in different memory unit(s) at a particular time (e.g., at the time of computing the sixth layer). In the variable memory 300, the output feature map $OF_4$ of the fourth layer may be stored in the third memory unit to the sixth memory unit at a certain time (e.g., at the time of the sixth layer operation). In this case, the size of the output feature map $OF_4$ of the fourth layer is 4, and the "size of the output feature map" refers to the number of memory banks of the variable memory 300 that are occupied by data corresponding to the output feature map.

According to one example of the present disclosure, the data stored in the variable memory 300 may be determined by determining caching entry such that the caching profit is maximized for each layer operation.

Figure 4:
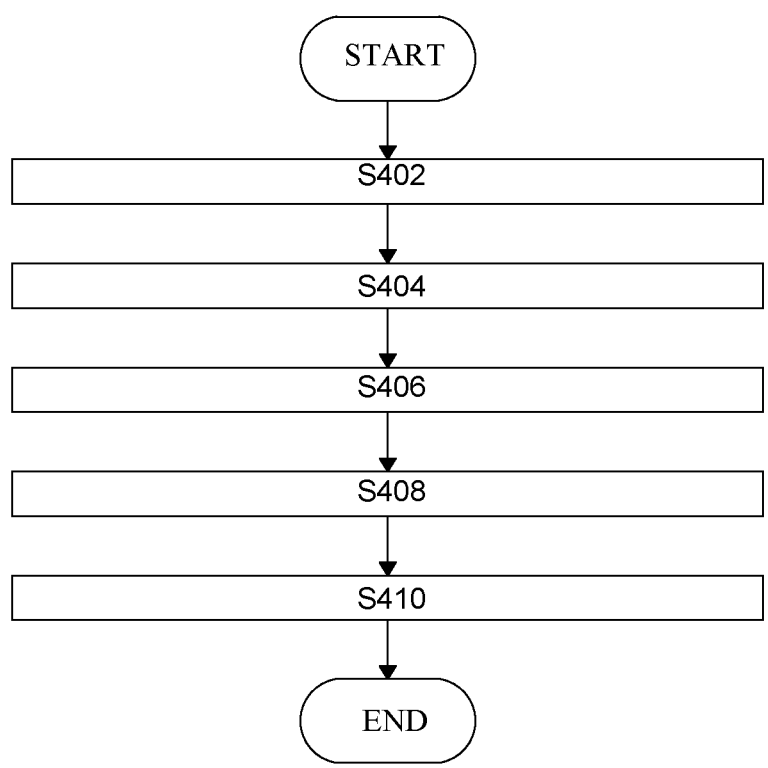
FIG. 4 is a flowchart illustrating a feature map reuse method operated by a neural processing unit according to one example of the present disclosure when the delta-step is one.

FIG. 4 illustrates a feature map reuse method operated by a neural processing unit according to one example of the present disclosure when the delta-step is one.

According to one example of the present disclosure, in a first layer of the at least one artificial neural network model, the neural processing unit may calculate a space cost based on the size of each of an input feature map, an output feature map, and a weight of the subsequent layer (S402).

The space cost refers to the number of memory units that need to be secured to store a particular feature map in a variable memory. The memory units may be referred to as memory banks or buffers. The space cost can be defined as the number of buffers in the variable memory corresponding to the sum of the size of the output feature map of the first layer, the size of the output feature map of the subsequent layer, and the size of the weights.

In the following, a particular feature map refers to the output feature map of the ith layer (where i is a positive integer), and the subscript i used in each term refers to a value in the ith layer operation.

The size of the output feature map of the ith layer can be represented by Equation 1.

$$\text{Size}_i = (C_i \times H_i \times W_i) \quad \text{Equation 1}$$

In Equation 1, Size$_i$ means the size of the output feature map of the ith layer. Based on Equation 1, the volume of the output feature map (i.e., tensor data) of the ith layer can be calculated, which consists of channels C, height H, and width W.

The size of the output feature map Size may mean the size of the feature map when the operation is performed on an individual thread basis. Hi may mean the height value of the output feature map of the ith layer, and $W_i$ may mean the width value of the output feature map of the ith layer. In one example, the height values of the output feature maps of the ith layer may be assumed to be the same.

The space cost can be represented as shown in Equation 2.

$$\text{Space Cost}_i = \frac{\text{Size}_i}{\text{MBSize}} + \frac{W_{i+1}}{\text{MBSize}} + \frac{\text{Size}_{i+1}}{\text{MBSize}} + \frac{\text{Elem}_{i+1}}{\text{MBSize}} \quad \text{Equation 2}$$

In Equation 2, (Size$_i$/MBSize) is the size of the output feature map of the ith layer, ($W_{i+1}$/MBSize) is the size of the weights of the (i+1)th layer, (Size$_{i+1}$/MBSize) is the size of the output feature map of the (i+1)th layer, and (Elem$_{i+1}$/MBSize) is the size of the second input feature map required for the (i+1)th layer computation. The ith layer can be referred to as the current layer and the (i+1)th layer as the subsequent layer. Further, MBSize refers to the size of a memory bank, which may be the depth of a memory bank of variable memory, i.e., the smallest unit of memory that a processing element can access at one time.

According to one example of the present disclosure, the neural processing unit may calculate a space cost for the output feature map of the ith layer based on the size of each of the input feature map, output feature map, and weights of the subsequent layer, taking into account the workflow up to the one-step layer.

The neural processing unit according to one example of the present disclosure may calculate a caching value for the first layer calculation (S404).

Caching value refers to the value that can be expected when a particular feature map is stored in a variable memory, that is, the value generated by not storing it in the main memory.

According to one example, the caching value can be modeled by the data size of a particular feature map. This is because caching that particular feature map eliminates the overhead of having to read it back via DMA when it is stored in main memory. Accordingly, the caching value can be defined as the size of the data corresponding to the performance profit obtained when the output feature map of a particular layer is stored in variable memory.

The caching value can be represented by Equation 3.

$$\text{Value}_i = \frac{\text{Size}_i}{\text{Bank unit Size}} \times \sum_{m=i+1, m > \text{time}}^{\Delta-\text{step}} 1_{(OF_i \text{ is connected to Layer}_m)} \quad \text{Equation 3}$$

In Equation 3, Bank unit Size is the size of the memory unit of the variable memory, and time is the current layer number being computed. Based on Equation 3, it can be seen that the caching value is a time-varying value as each layer operation proceeds.

According to one example of the present disclosure, the neural processing unit can calculate the caching value (or the expected caching value) obtained when caching the output feature map candidates in consideration of the workflow up to the one-step layer.

Based on the space cost and caching value, the neural processing unit according to one example of the present disclosure may determine a caching profit for the first layer computation (S406).

The caching profit may mean the profit of caching the feature map(s) having the maximum caching value relative to the space cost without exceeding the capacity of the variable memory. The caching profit may be updated at each layer computation. According to one example of the present disclosure, by determining the caching profit at each layer operation using the space cost and caching value for each of the plurality of feature maps, a combination (i.e., caching entry) can be found that produces the greatest profit without exceeding the size of the variable memory. The caching entry can be determined based on the order of operations of each layer in the at least one neural network model, and the size of the input feature map and output feature map of each layer in the caching candidate entries.

The caching profit may be represented as shown in Equation 4.

$$\text{Profit}[i][sc] = \begin{cases} \text{Max (profit } [i-1][sc] + \text{penalty } (S \to D), \\ \quad \text{value} + \text{profit } [i-1][sc - \text{cost}_i] + \\ \quad \text{penalty } (D \to S) \text{ if } \text{Cost}_i \leq sc \\ \text{profit } [i-1][sc] + \text{penalty } (S \to D) \\ \quad \text{if } \text{Cost}_i > sc \end{cases} \quad \text{Equation 4}$$

In Equation 4, Profit[i][sc] may mean the maximum profit that can be stored within the total number of memory banks sc of variable memory for i (i=0, 1, . . . ) output feature maps. There may be N output feature maps that are not evicted at a given time t, and N output feature maps that are not evicted at a given time t can be caching candidate entries.

If Cost$_i$ is less than or equal to sc, that is, if the number of memory units that need to be acquired to store the ith feature map in the variable memory is less than or equal to (not greater than) the total number of memory banks in the variable memory, the caching profit can be determined as the greater of the profit when the output feature map of the ith layer is not cached and the profit when the output feature map of the ith layer is cached. The profit of not caching the output feature map of the ith layer is the opportunity cost of not storing the output feature map of the ith layer in variable memory, calculated as the caching profit of the feature map that could be stored in that space instead.

The profit of not caching the output feature map of the ith layer (i.e., the current layer) can be calculated as the sum of the caching profit of the (i−1)th layer (i.e., the previous layer) and the penalty S→D. Penalty S→D means the state transition penalty cost when the output feature map is moved from variable memory SRAM to main memory DRAM. Since not caching the output feature map of the ith layer means that it is stored in main memory, penalty S→D means the overhead of writing it when a transition occurs from variable memory to main memory.

The profit of caching the output feature map of the ith layer can be calculated as the sum of the caching value of the cached ith layer, the caching profit of the (i−1)th layer (i.e., the previous layer) when the space cost of the ith layer (i.e., the current layer) is subtracted from the sc, and the penalty D→S. Penalty D→S means the state transition penalty cost when the output feature map is moved from main memory DRAM to variable memory SRAM. Since caching the output feature map of the ith layer means that it is stored in variable memory, penalty D→S means the overhead of writing it when a transition occurs from main memory to variable memory.

Therefore, if $Cost_i$ is less than or equal to sc, the neural processing unit can compare the profit of not caching the output feature map of the ith layer with the profit of caching the output feature map of the ith layer for every layer and update the caching profit to the larger value.

If $Cost_i$ is greater than sc, i.e., the number of memory units required to store the ith feature map in variable memory is greater than the total number of memory banks in variable memory, the ith feature map cannot be stored in variable memory. Therefore, if $Cost_i$ is less than or equal to sc, the caching profit can be determined as the sum of the caching profit of the (i−1)th layer (i.e., the previous layer) and the penalty S→D.

In the delta-step caching algorithm, if a combination of caching is determined that produces the same caching profit, the output feature map utilized first may be prioritized and cached. This is because, if an output feature map is cached that is not used in the subsequent layer operation, the cached output feature map may be evicted again while freeing up space to load the input feature maps needed for the subsequent layer operation into variable memory.

Figure 5:
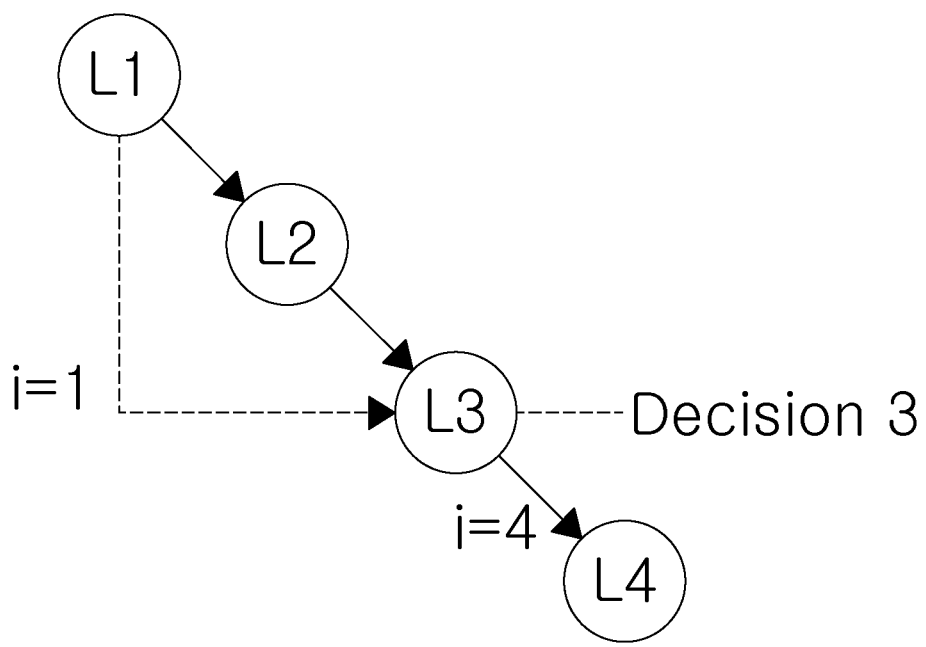
FIG. 5 is a graph representing caching candidate entries of an artificial neural network model according to one example of the present disclosure.

FIG. 5 shows an exemplary graph of caching candidate entries (N=4).

Referring to FIG. 5, the output feature maps (i.e., caching candidate entries) that are not evicted at a particular time (t) are the first output feature map (i=1) of the first layer L1 that is input to the third layer L3, a second output feature map (i=2) of the first layer L1 input to the second layer L2, an output feature map (i=3) of the second layer L2 input to the third layer L3, and an output feature map (i=4) of the third layer L3 input to the fourth layer L4. Here, it is assumed that the first layer L1, the second layer L2, the third layer L3, and the fourth layer L4 are operated in that order.

In this case, the space cost and caching value of each output feature map included in the cache candidate entries in the third layer L3 operation can be calculated as shown in Table 1.

TABLE 1

| i | Space Cost | Caching Value |
|---|---|---|
| 1 | 5 | 10 |
| 2 | 4 | 40 |
| 3 | 6 | 30 |
| i = 4 | 3 | 50 |

The caching profit according to the variable memory size of each output feature map included in the cache candidate entry can be calculated as shown in Table 2.

TABLE 2

| | sc = 0 | sc = 1 | sc = 2 | sc = 3 | sc = 4 | sc = 5 | sc = 6 | sc = 7 | sc = 8 | sc = 9 | sc = 10 |
|---|---|---|---|---|---|---|---|---|---|---|---|
| i = 1 | 0 | 0 | 0 | 0 | 0 | 10 | 10 | 10 | 10 | 10 | 10 |
| i = 2 | 0 | 0 | 0 | 0 | 40 | 40 | 40 | 40 | 40 | 50 | 50 |
| i = 3 | 0 | 0 | 0 | 0 | 40 | 40 | 40 | 40 | 40 | 50 | 70 |
| i = 4 | 0 | 0 | 0 | 50 | 50 | 50 | 50 | 90 | 90 | 90 | 90 |

Referring to Table 2, the caching profit for the graph corresponding to FIG. 5 can be determined to be 90. Also, referring to Table 2, the caching profit in the case of (i=3) and sc=0 is zero. This means that when the number of memory banks of the variable memory is three, the caching profit is zero when considering three output feature maps (i=1, 2, 3).

Referring again to FIG. 4, the neural processing unit according to one example of the present disclosure may determine a caching entry having the maximum caching profit among the caching candidate entries (S408).

According to one example, the caching entry may be determined among the caching candidate entries using a dynamic programming-based algorithm.

As an example, referring to Table 2, when sc=10, the caching profit when considering four output feature maps (i=1, 2, 3, 4) can be compared to the caching profit when considering three output feature maps (i=1, 2, 3). In the case of sc=10, the caching profit when considering four output feature maps (i=1, 2, 3, 4) is 90 and the caching profit when considering three output feature maps (i=1, 2, 3) is 70, which means that the output feature map (i=4) of the third layer L3 that is input to the fourth layer L4 at a certain time (t) is stored in variable memory. This is because the caching profit has changed from 70 to 90 because the output feature map when (i=4) is cached.

Since the output feature map at (i=4) is stored in variable memory, it means that the number of memory units in variable memory corresponding to the space cost of the output feature map at (i=4), that is, three memory units (see Table 1) is occupied by the data in the output feature map at (i=4). Therefore, the caching profit can be determined by moving the column from the sc=10 case to the sc=7 case.

Referring to Table 2, the caching profit when considering three output feature maps (i=1, 2, 3) can be compared with the caching profit when considering two output feature maps (i=1, 2) for sc=7. In the case of sc=7, the caching profit when considering three output feature maps (i=1, 2, 3) is 40 and the caching profit when considering two output feature maps (i=1, 2) is 40, which means that the output feature map (i=3) of the second layer L2 input to the third layer L3 at a certain time (t) is not stored in the variable memory. Since the output feature map when (i=3) is not cached, the caching profit when considering three output feature maps (i=1, 2, 3) and the caching profit when considering two output feature maps (i=1, 2) have the same value.

Since the output feature map at (i=3) is not stored in variable memory, it means that the data of the output feature map at (i=4) is still only occupied by the number of memory units in variable memory that corresponds to the space cost of the output feature map at i=4, that is, three memory units (see Table 1). Therefore, the caching profit when considering up to two output feature maps (i=1, 2) at sc=7 can be compared with the caching profit when considering only the first output feature map (i=1) of the first layer L1 that is input to the third layer L3. In the case of sc=7, the caching profit is 10 when only the first output feature map (i=1) of the first layer L1 is considered, which means that the second output feature map (i=2) of the first layer L1 input to the second layer L2 is stored in the variable memory.

According to one example, using the dynamic programming-based algorithm described above, the second output feature map (i=2) of the first layer L1 input to the second layer L2 and the output feature map (i=4) of the third layer L3 input to the fourth layer LA can be determined as a caching entry among the four caching candidate entries.

At each layer operation, the cache status of each feature map can be recorded as shown in Table 3.

TABLE 3

|  | i = 1 | i = 2 | i = 3 | i = 4 |
| --- | --- | --- | --- | --- |
| Decision = 3 | 0 | 1 | 0 | 1 |
| Decision = 4 | 1 | 0 | 0 | 1 |

Referring to Table 3, among the four caching candidate entries when Decision=3, the output feature maps when (i=2) and (i=4) are cache entries. Decision=3 indicates the time of computation of the third layer, where 0 means not cached, and 1 means cached. Table 3 can be used to calculate a penalty (e.g., penalty D→S) for the operation of a dynamic programming-based algorithm in the subsequent layer (or Decision).

The neural processing unit according to one example of the present disclosure may store the caching entry in a variable memory (S410).

Exemplarily, the neural processing unit may store the output feature map at (i=2, i=4) determined by the caching entry in the variable memory.

Figure 6:
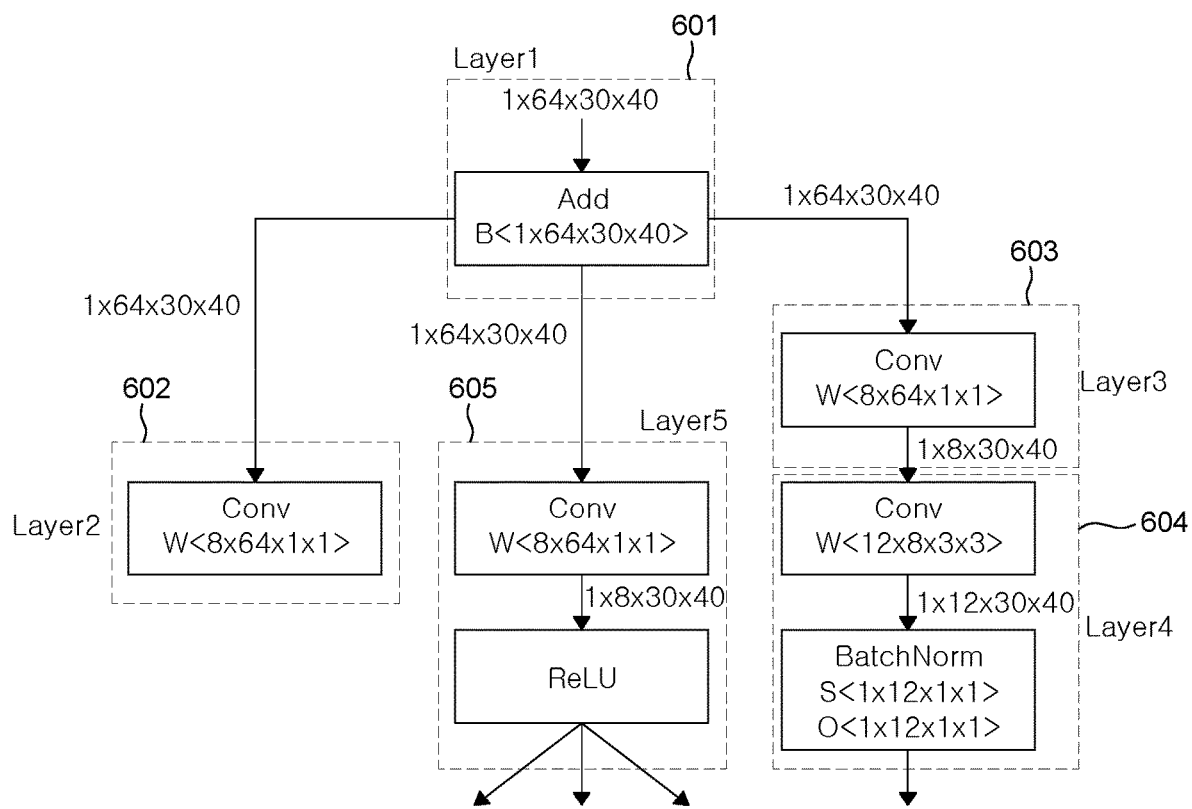
FIG. 6 is a diagram illustrating a graphic structure of an artificial neural network model according to one example of the present disclosure.

FIG. 6 illustrates a graphic structure of an artificial neural network model according to one example of the present disclosure. That is, FIG. 6 is a directed acyclic graph (DAG) according to one example of the present disclosure.

Referring to FIG. 6, subsequent layers of the first layer 601 may be a second layer 602, a third layer 603, and a fifth layer 605. The order of operations is assumed to be the first layer 601, the second layer 602, the third layer 603, the fourth layer 604, and the fifth layer 605. When an output feature map is output from the operation of the first layer 601, the output feature map of the first layer 601 is input to the input feature map of the second layer 602 so that the operation of the second layer 602 can be performed. The output feature map of the first layer 601 may be input to the input feature map of the third layer 603 to perform the third layer 603 operation, and the output feature map of the third layer may be input to the input feature map of the fourth layer 604 to perform the fourth layer 604 operation. The output feature map of the first layer 601 may be input to the input feature map of the fifth layer 605, and the fifth layer 605 operation may be performed.

Table 4 shows items calculated for caching entry determination when the delta-step is one for the graph of FIG. 6 and indicates whether or not the output feature map of the ith layer is cached.

TABLE 4

| $Layer_i$ | $Total\_Size_i$ | $Value_i$ (After Layer 1) | $Value_i$ (After Layer 2) | $Value_i$ (After Layer 3) | $Value_i$ (After Layer 4) | $Value_i$ (After Layer 5) | Action when $\Delta = 1$ |
| --- | --- | --- | --- | --- | --- | --- | --- |
| 1 | 5 | 15 | 10 | 5 | 5 | 0 | SRAM Caching |
| 2 | 9 | — | 9 | 9 | 9 | 9 | SRAM Caching |
| 3 | 9 | — | — | 9 | 0 | 0 | DRAM - Write |
| 4 | 6 | — | — | — | 6 | 6 | DRAM - Write |
| 5 | 4 | — | — | — | — | 12 | SRAM Caching |

Referring to Table 4, the items calculated for cache entry decisions include the size Total_Size; (i.e., space cost) of the output feature maps in Layer 1 through Layer 5, and the caching value $Value_i$ FIGS. 7 to 11 are diagrams illustrating internal configurations of main memory and variable memory while determining caching entry for the graph of FIG. 6 when delta-step is one.

FIGS. 7 through 11 respectively illustrate internal configurations of main memory and variable memory from first layer to fifth layer operations, respectively, when delta-step is one.

In FIGS. 7 to 11, for example, $OF_1$ (15) means that the caching value of the output feature map of the first layer is 15 at the current computation time (e.g., after the first layer computation).

Referring to FIG. 7, the neural processing unit may determine to store the output feature map $OF_1$ of the first layer in the variable memory SRAM at the time of the first layer operation. In one example, the size of the output feature map $OF_1$ of the first layer is 5, and the output feature map $OF_1$ of the first layer may occupy the zeroth to fourth memory banks of the variable memory (SRAM).

Referring to FIG. 8, the neural processing unit may determine to store the output feature map $OF_2$ of the second layer in the variable memory SRAM during the second layer operation. The output feature map $OF_2$ of the second layer may have a size of 9 and may occupy a fifth to thirteenth memory banks of the variable memory SRAM. Also, since the output feature map $OF_1$ of the first layer operation is used in the second layer operation, the caching value of the output feature map $OF_1$ of the first layer operation is reduced (15→10) according to Equation 3.

Figure 9:
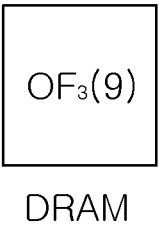

Referring to FIG. 9, the neural processing unit may determine to store the output feature map $OF_3$ of the third layer in the main memory DRAM during the third layer operation. This is because, considering the size 9 of the output feature map $OF_3$ of the third layer, there is not enough space to cache the output feature map $OF_3$ of the third layer, and the caching value of the output feature map $OF_3$ of the third layer has a smaller value than the caching value of the output feature map $OF_1$ of the first layer.

Figure 10:
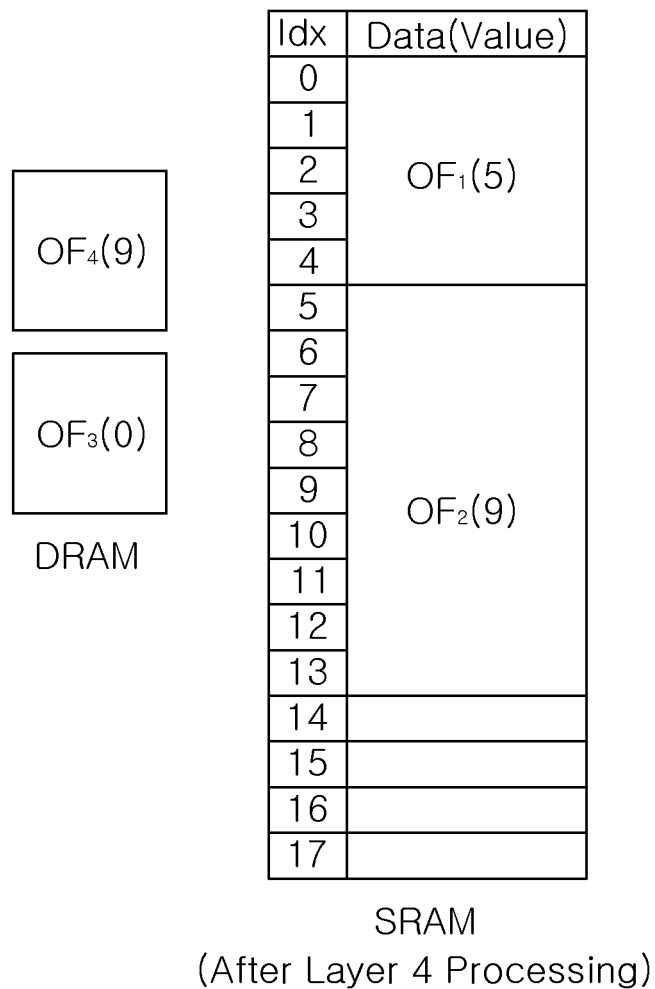

Referring to FIG. 10, the neural processing unit may determine to store the output feature map $OF_4$ of the fourth layer in the main memory DRAM during the fourth layer operation. The reason for determining to store the output feature map $OF_4$ of the fourth layer in the main memory DRAM is that there is not enough space to cache the output feature map $OF_4$ of the fourth layer, and the caching value of the output feature map $OF_4$ of the fourth layer does not have a higher value than the caching value of the output feature map $OF_2$ of the second layer. On the other hand, although the caching value 9 of the output feature map $OF_4$ of the fourth layer operation is higher than the current caching value 5 of the output feature map $OF_1$ of the first layer, the output feature map $OF_4$ of the fourth layer operation is stored in the main memory DRAM because the overhead incurred by storing the output feature map $OF_1$ of the first layer in the main memory DRAM is greater than the caching value of the output feature map $OF_4$ of the fourth layer operation.

Referring to FIG. 11, the neural processing unit may determine to store the output feature map $OF_5$ of the fifth layer in the variable memory SRAM during the fifth layer operation. In one example, the size of the output feature map $OF_5$ of the fifth layer is four, and the fifth layer operation may occupy a first memory bank or a second memory bank of the variable memory.

According to the example of FIGS. 7 to 11, when the delta-step is one, the total cumulative caching profit at the end of the fifth layer operation is 15.

Figure 12:
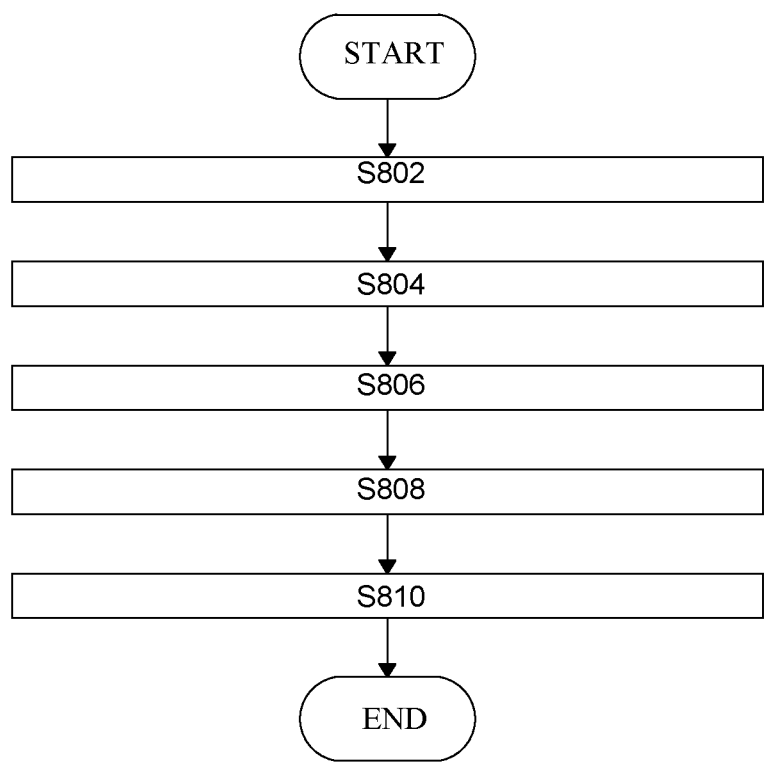
FIG. 12 is a flowchart illustrating a feature map reuse method operated by a neural processing unit according to one example of the present disclosure when the delta-step is two or more.

FIG. 12 illustrates a feature map reuse method operated by a neural processing unit according to one example of the present disclosure when the delta-step is two or more.

In the first layer of the at least one artificial neural network model, the neural processing unit according to one example of the present disclosure may calculate a space cost based on the size of each of the input feature map, the output feature map, and the weight for each layer in the delta-step layer (S802).

With respect to the layer currently being computed, a delta-step layer may be used as a term to refer to an arbitrary layer when (Δ) layer(s) are located on a path between the layer currently being computed (e.g., the first layer) and the arbitrary layer.

Specifically, in a graph structure of an artificial neural network model, an arbitrary layer may be a delta-step layer with respect to the currently computed layer if (Δ) layers are located in a path between the currently computed layer and the arbitrary layer. For example, referring to FIG. 6, when Δ-2, the layer may be a two-step layer if (2-1) layers, i.e., one layer, are located in the path between the currently computed first layer 601 and the arbitrary layer. In the graph structure of the artificial neural network model of FIG. 6, the path between each of the first layer, the second layer, and third layer has zero layer disposed therebetween, so it is not regarded as a two-step layer. In the graph structure of the artificial neural network model in FIG. 6, the path between the first layer and the fourth layer has one layer disposed therebetween, so it is regarded as a two-step layer with respect to the first layer which is being computed.

In one example, the two-step caching algorithm (i.e., when Δ=2), for each layer in the two-step layer, may include calculating a space cost based on the computation of an input feature map, an output feature map, and a weight. Here, if one layer is located in the path between an arbitrary layer and a first layer in the graph structure of the AI model, the two-step layer may refer to that arbitrary layer(s), i.e., "the subsequent layer of the subsequent layer of the first layer."

In another example, the path between the currently computed layer and any layer may mean the path in the order of computations in the graph structure of the AI model. Each layer within a delta-step layer means each layer within it, and excluding the delta-step layer.

A two-step caching algorithm may mean an algorithm for determining caching entry by considering whether operations on the layer(s) located within the two-step layer are feasible based on variable memory capacity.

The neural processing unit according to one example of the present disclosure may calculate a caching value for the first layer operation (S804).

The neural processing unit according to one example of the present disclosure may determine a caching profit for the first layer computation based on the space cost and the caching value (S806).

The neural processing unit according to one example of the present disclosure may determine a caching entry having the maximum caching profit among the caching candidate entries (S808).

The neural processing unit according to one example of the present disclosure may selectively store the cache entry in at least one memory unit of the plurality of memory units (S810).

FIGS. 13 to 17 respectively illustrate internal configurations of a main memory and a variable memory while determining a caching entry when the delta-step is three for the graph of FIG. 6.

In FIGS. 13 to 17, for example, $OF_1$ (15) means that the caching value of the output feature map of the first layer at the current computation time (e.g., after the first layer computation) is 15.

Table 5 shows items calculated for caching entry determination when the delta-step is three for the graph of FIG. 6 and indicates whether or not the output feature map of the ith layer is cached.

TABLE 5

| $Layer_i$ | $Total\_Size_i$ | $Value_i$ (After Layer 1) | $Value_i$ (After Layer 2) | $Value_i$ (After Layer 3) | $Value_i$ (After Layer 4) | $Value_i$ (After Layer 5) | Action when Δ = 3 |
|---|---|---|---|---|---|---|---|
| 1 | 5 | 15 | 10 | 5 | 5 | 0 | SRAM Caching |
| 2 | 9 | — | 9 | 9 | 9 | 9 | DRAM Write |
| 3 | 9 | — | — | 9 | 0 | 0 | SRAM Caching |
| 4 | 6 | — | — | — | 6 | 6 | SRAM Caching |
| 5 | 4 | — | — | — | — | 12 | SRAM Caching |

Referring to Table 5, the calculated items for determining cache entry may include the size $Total\_Size_i$ (i.e., space cost) of the output feature map of the first layer to the fifth layer, and the cache value $Value_i$.

Referring to FIG. 13, the neural processing unit may determine to store the output feature map $OF_1$ of the first layer in the variable memory SRAM during the first layer operation. In one example, the size of the output feature map $OF_1$ of the first layer is 5, and considering the operation in the three-step layer, that is, considering the caching value according to whether the output feature map $OF_2$ of the second layer and the output feature map $OF_3$ of the third layer are cached, the output feature map $OF_1$ of the first layer may occupy the zero memory bank to the fourth memory bank of the variable memory.

Here, a three-step layer is a layer that corresponds to an arbitrary layer if there are two layers (i.e., second layer and third layer) between the layer currently being computed (i.e., first layer) and the arbitrary layer, so the arbitrary layer is the fourth layer.

Figure 14:
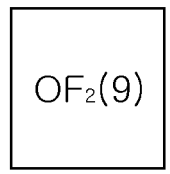

Referring to FIG. 14, the neural processing unit may determine to store the output feature map $OF_2$ of the second layer in the main memory DRAM during the second layer operation. Although there is space to cache the output feature map $OF_2$ of the second layer, considering the caching value of the output feature map $OF_3$ of the third layer and the output feature map $OF_4$ of the fourth layer, the output feature map $OF_2$ of the second layer has the same caching value as the output feature map $OF_3$ of the third layer. At this time, since the output feature map $OF_3$ of the third layer is utilized before the output feature map $OF_2$ of the second layer, the output feature map $OF_2$ of the second layer may be stored in the main memory DRAM to free up space for the output feature map $OF_3$ of the third layer to be cached.

Figure 15:
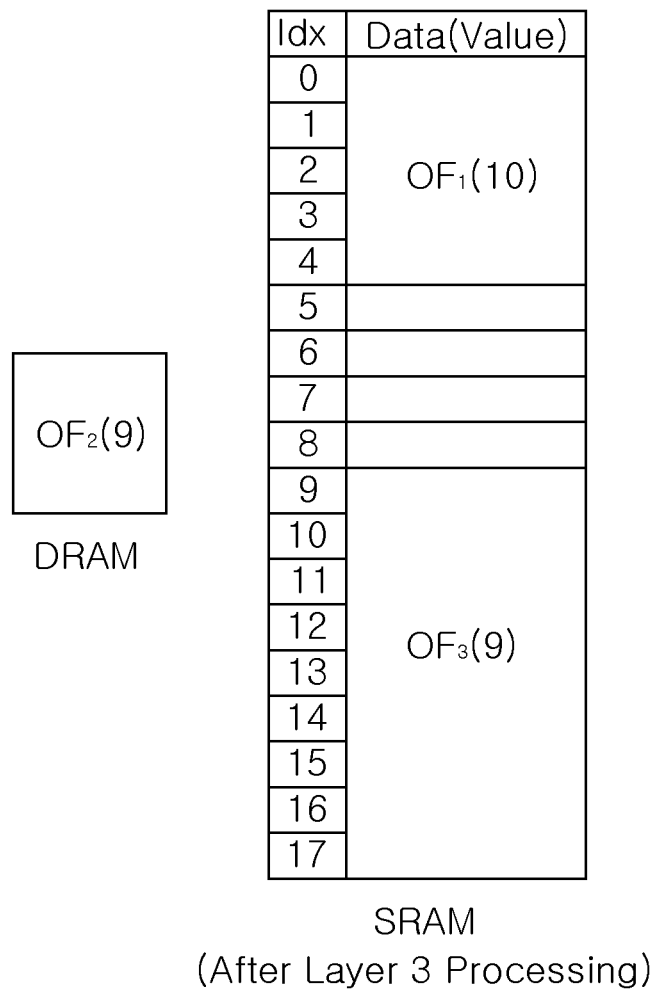

Referring to FIG. 15, the neural processing unit may determine to store the output feature map $OF_3$ of the third layer in a variable memory SRAM. Since the output feature map $OF_3$ of the third layer is used and removed in the fourth layer operations, even considering the operations within the three-step layer, the caching profit is greatest when the output feature map $OF_3$ of the third layer is cached in all possible combinations of cache entries. Therefore, the output feature map $OF_3$ of the third layer may occupy ninth to seventeenth memory banks of the variable memory SRAM.

Referring to FIG. 16, the neural processing unit may determine to store the fourth layer's output feature map $OF_4$ in the variable memory SRAM. The output feature map $OF_4$ of the fourth layer may occupy fifth to tenth memory banks of the variable memory SRAM because there is space to store the output feature map $OF_4$ of the fourth layer, and caching the fourth layer operations produces the largest caching profit when considering the operations in the three-step layer. In the case of the output feature map $OF_3$ of the third layer that occupies the ninth memory bank and the tenth memory bank among the banks of the SRAM, ninth and tenth memory banks among the banks of the SRAM may be overwritten by the output feature map $OF_4$ of the fourth layer because they are data that is no longer used as the output feature map $OF_4$ of the fourth layer is generated.

Figure 17:
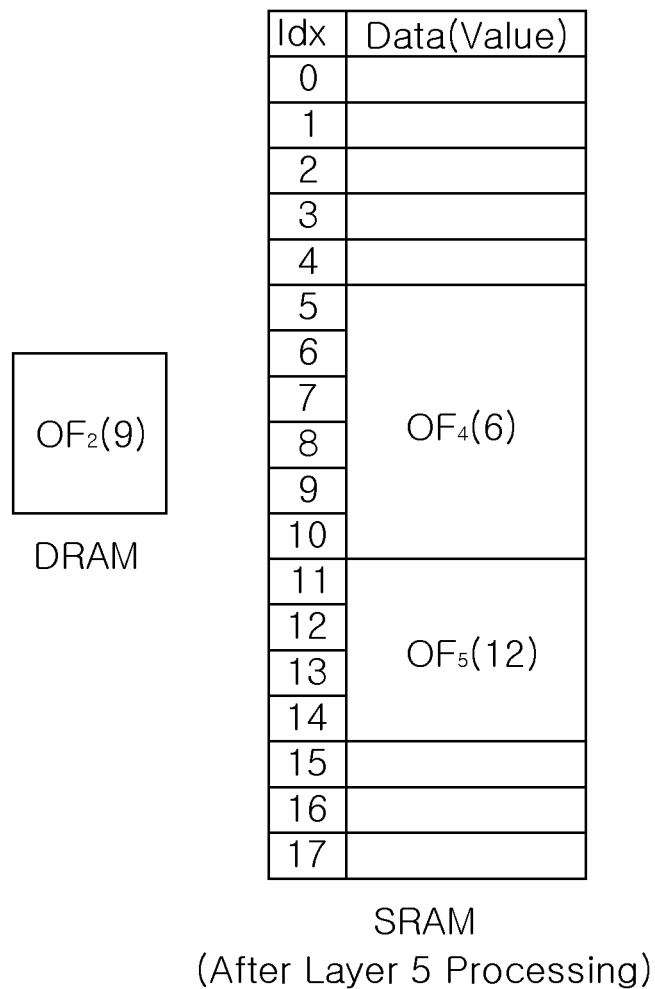

Referring to FIG. 17, the neural processing unit may determine to store the output feature map $OF_5$ of the fifth layer in the variable memory SRAM. Since there is space to store the output feature map $OF_5$ of the fifth layer and since caching the output feature map $OF_5$ of the fifth layer produces the largest caching profit considering the operations in the three-step layer, the output feature map $OF_5$ of the fifth layer may occupy eleventh to fourteenth memory banks of the variable memory SRAM.

In the example of FIGS. 13 through 17, when the delta-step is three, the total cumulative caching profit at the end of the fifth layer operation is 24.

Figure 18:
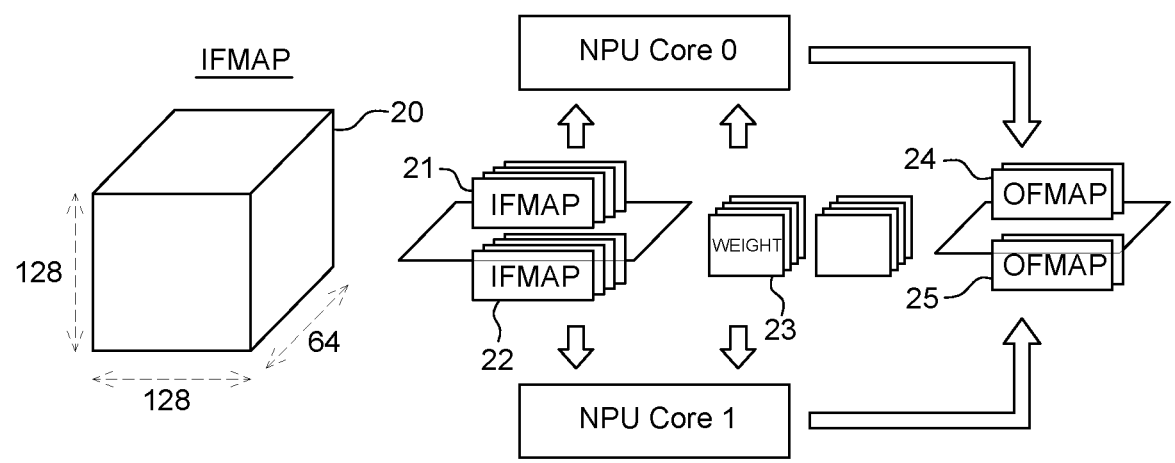
FIG. 18 is a diagram illustrating a layer computation process when thread partitioning is performed in the height direction of the output feature map.
Figure 19:
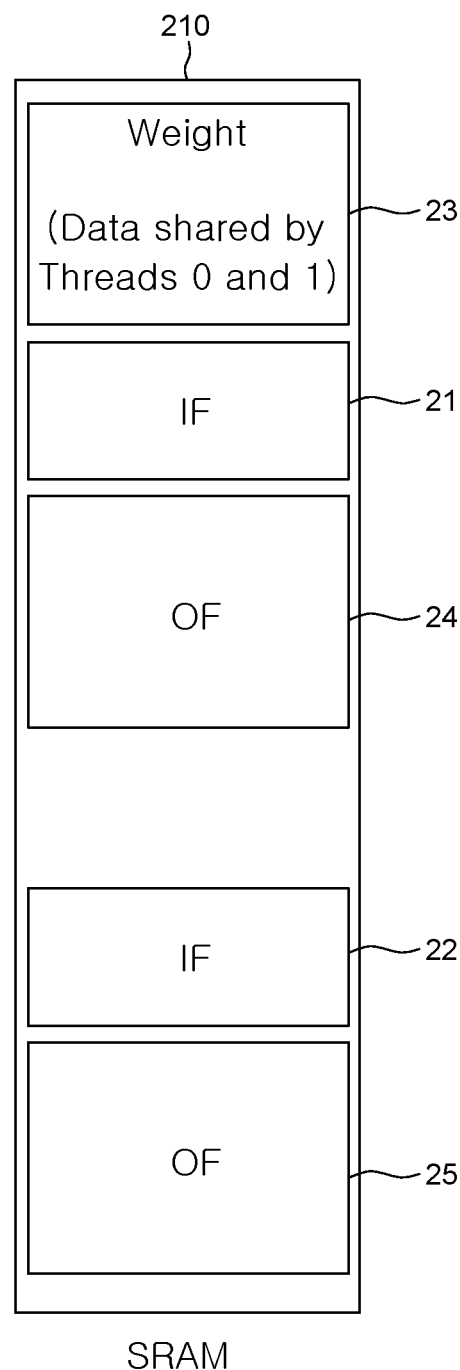
FIG. 19 is a diagram illustrating a data structure stored in the variable memory when thread partitioning is performed in the height direction of the output feature map.

FIG. 18 illustrates a layer computation process when thread partitioning is performed in the height direction of the output feature map, and FIG. 19 illustrates a data structure stored in the variable memory when thread partitioning is performed in the height direction of the output feature map.

FIG. 18 shows the process of dividing the tensor data into two threads Thread 0, Thread 1 to perform layer operations when the tensor data with channel=64, height=128, width=128 is an input feature map IFMAP. In order to partition the tensor data into multiple threads and perform layer operations, the feature map or weights can be tiled and used. In this disclosure, the term "partitioning" may be used interchangeably with "tiling."

If the neural processing unit 1000 is configured with dual cores, that is, if the plurality of processing elements 400 is configured with two arrays of processing elements, the tensor data partitioned into two threads may be computed in parallel on the neural processing unit 1000. In one example, the weights 23 are shared by the first sub-input feature map 21 and the second sub-input feature map 22, and the first sub-input feature map 21 and the second sub-input feature map 22 are input to the first core NPU Core 0 and the second core NPU Core 1, respectively, so that layer operations can be performed in parallel. Further, the first core NPU Core 0 and the second core NPU Core 1 may output the first sub-output feature map 24 and the second sub-output feature map 25. According to an example, when the input feature map 20 is divided into two threads by the first core NPU Core 0 and the second core NPU Core 1 to perform layer operations, the space cost of a particular layer operation may have a different value, that is, the space cost may be determined based on the tiling method of a particular layer.

Referring to FIG. 19, the variable memory 210 may store the weights 23 shared by the two threads Thread 0, Thread 1, the first sub-input feature map 21, the first sub-output feature map 24, the second sub-input feature map 22, and the second sub-output feature map 25 as illustrated in the structure.

Figure 20:
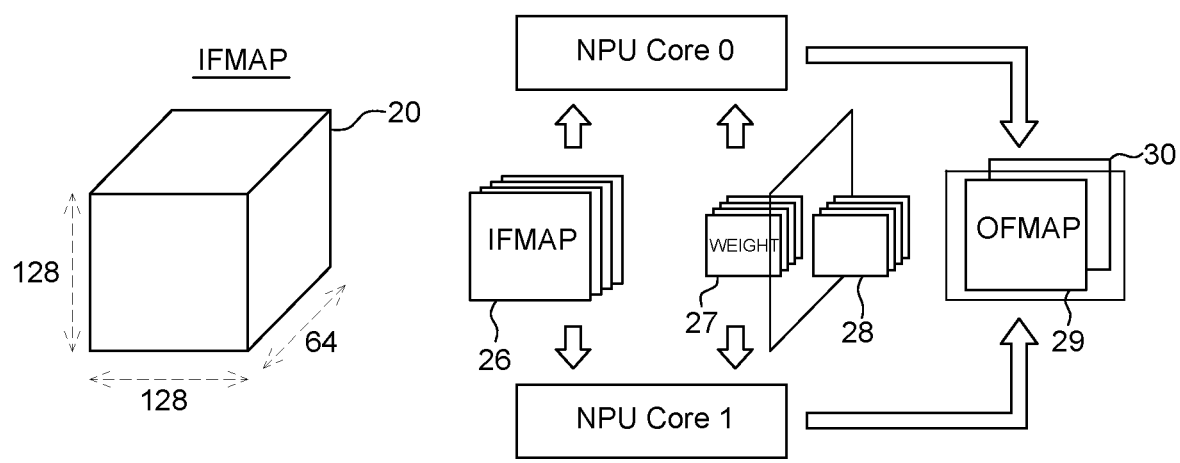
FIG. 20 is a diagram illustrating a layer operation process when thread partitioning is performed in the channel direction of weights.
Figure 21:
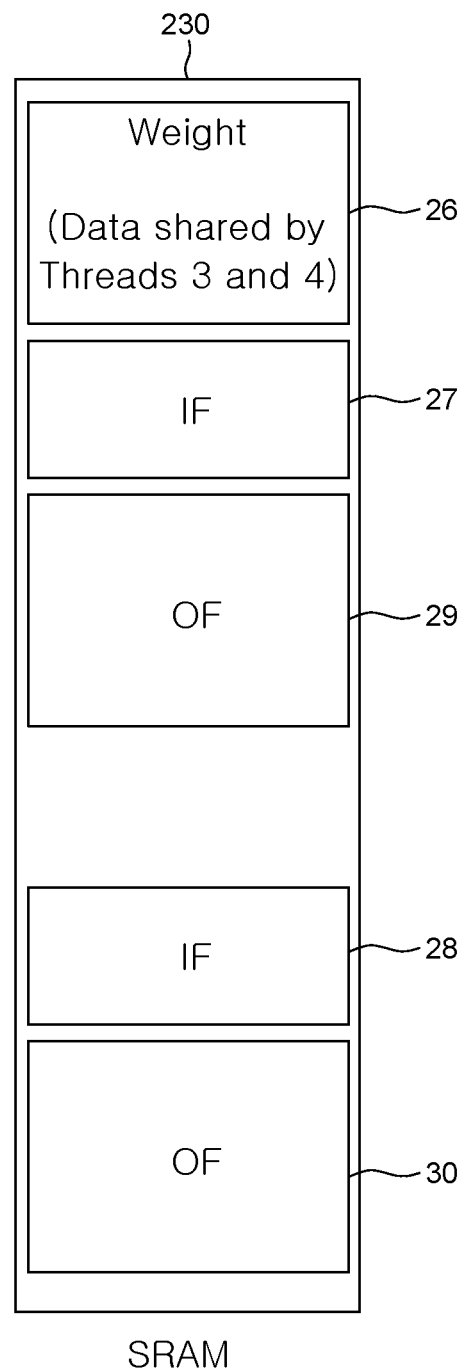
FIG. 21 is a diagram illustrating a data structure stored in variable memory when thread partitioning is performed in the channel direction of weights.

FIG. 20 illustrates a layer operation process when thread partitioning is performed in the channel direction of weights, and FIG. 21 illustrates a data structure stored in variable memory when thread partitioning is performed in the channel direction of weights.

FIG. 20 shows a process of performing a layer operation by dividing the tensor data into two threads Thread 3, Thread 4 when the tensor data with channel=64, height=128, width=128 is an input feature map IFMAP.

If the neural processing unit 1000 is configured with dual cores, the neural processing unit 1000 can perform layer operations on the tensor data divided into two threads in parallel. In one example, the input feature map 26 is shared by the first sub-weight 27 and the second sub-weight 28, and layer operations can be performed simultaneously using the first sub-weight 27 and the second sub-weight 28 on the first core NPU Core 0 and the second core NPU Core 1 of the neural processing unit 1000, respectively. Further, the first core NPU Core 0 and the second core NPU Core 1 may output the third sub-output feature map 29 and the fourth sub-output feature map 30.

According to one example, when the first core NPU Core 0 and the second core NPU Core 1 of the neural processing unit 1000 perform layer operations using weights divided into two threads, the space cost of a particular layer operation may have different values. That is, the space cost may be determined based on the tiling method of the particular layer.

Referring to FIG. 21, the variable memory 230 may store an input feature map 26, a first sub-weight 27, a first sub-output feature map 29, a second sub-weight 28, and a second sub-output feature map 30 shared by the two threads Thread 3, Thread 4 as illustrated in the structure.

Figure 22:
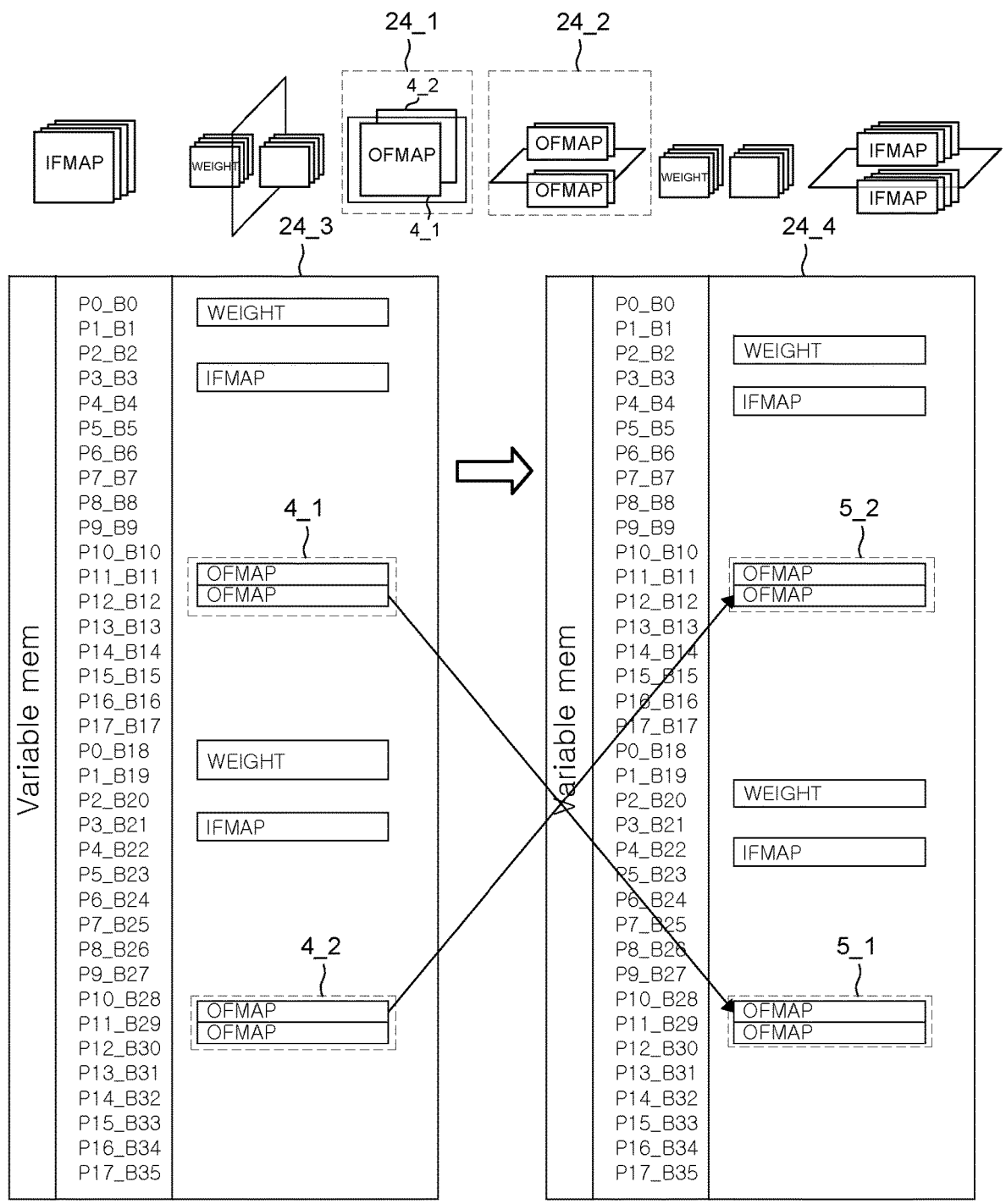
FIGS. 22 to 24 are diagrams respectively illustrating changes in space cost due to differences in partitioning methods between layers.
Figure 23:
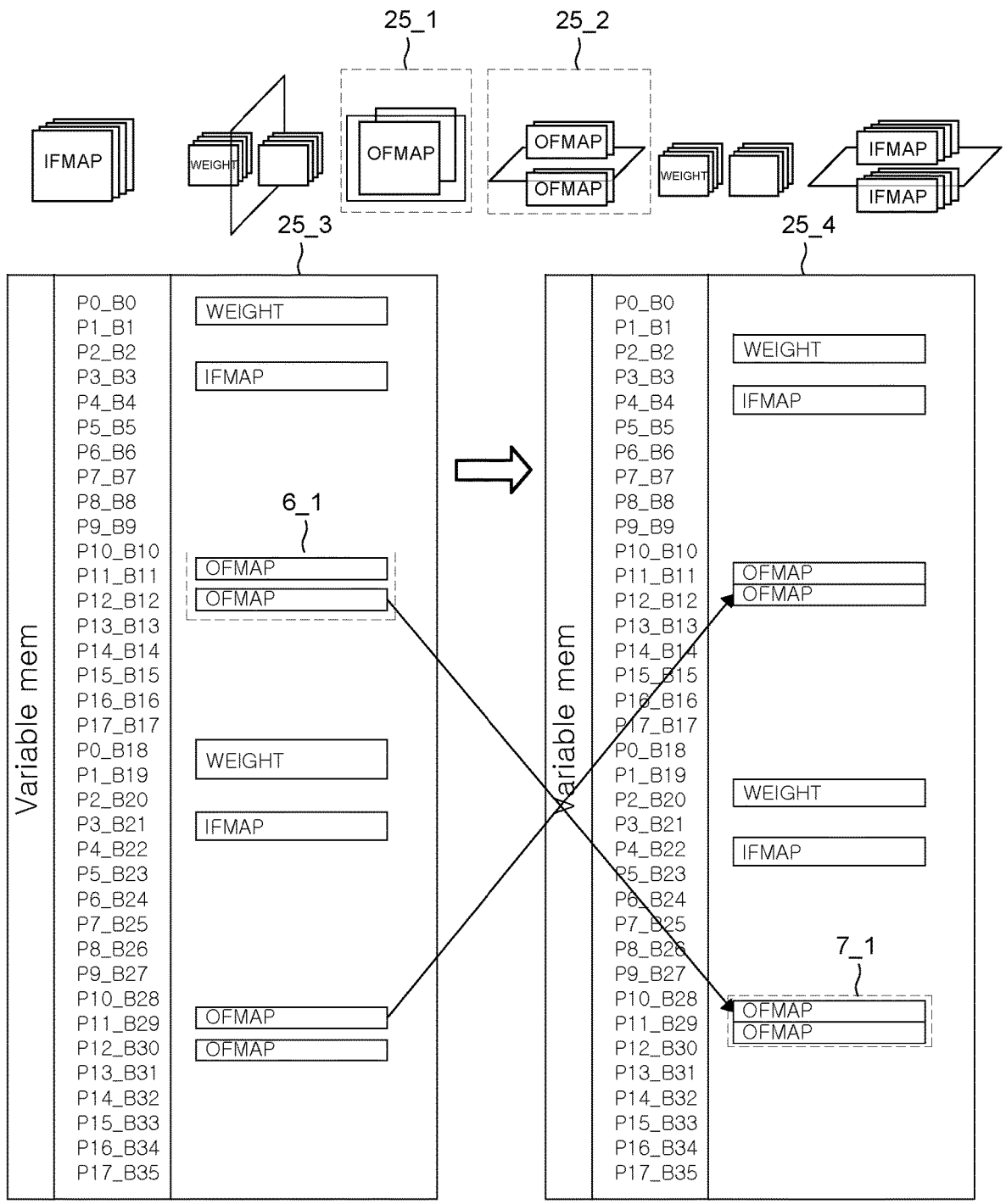
Figure 24:
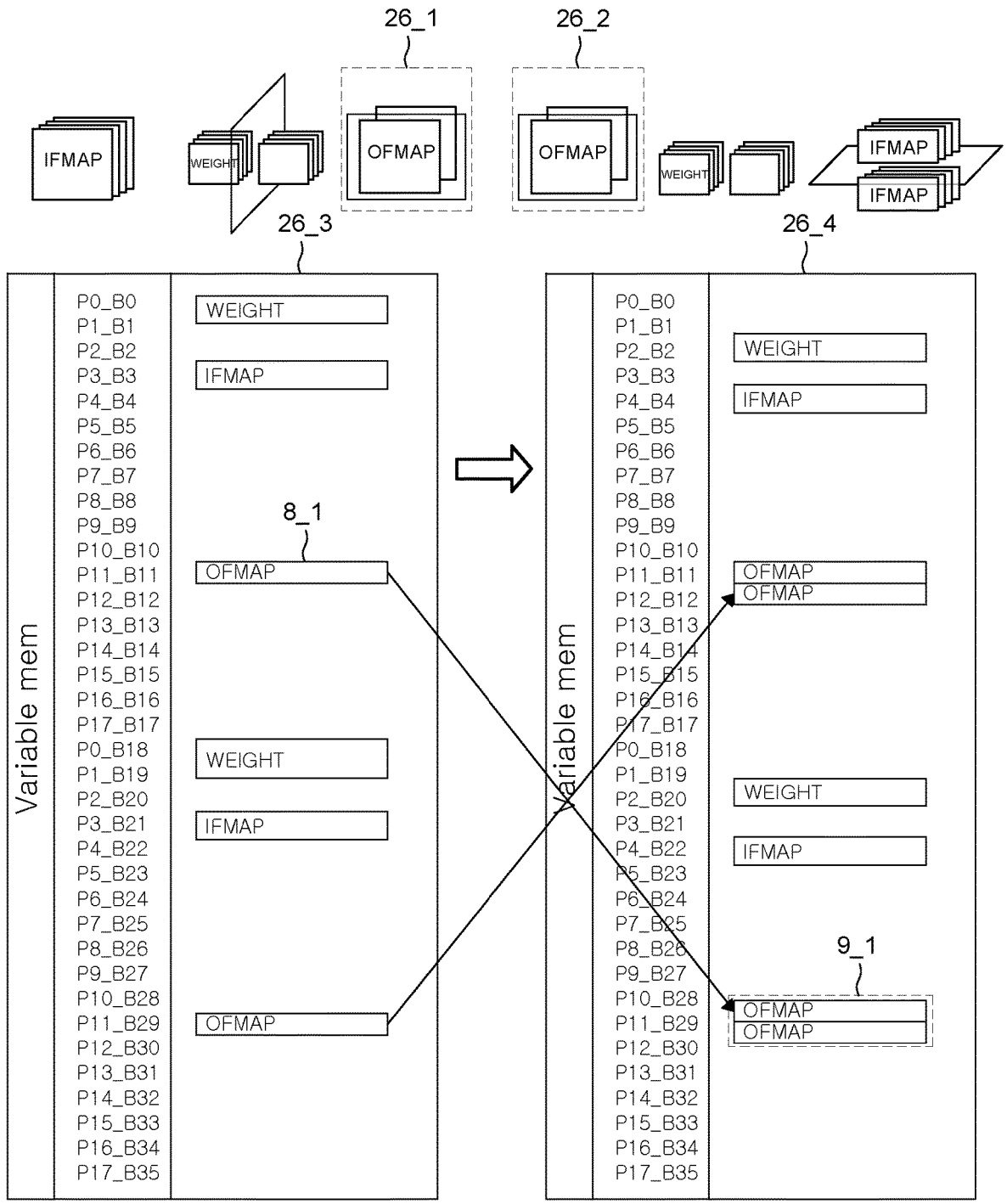

FIGS. 22 to 24 respectively illustrate changes in space cost due to differences in partitioning methods between layers.

When the subsequent layer operation after the first layer operation is performed, if the first layer operation and the subsequent layer operation are performed without tiling of the output feature map and the partitioning method between the layers is the same, the space cost of the first layer operation may correspond to the size of the output feature map of the first layer. However, according to the examples of FIGS. 22 to 24, the space cost of the first layer operation may not correspond to the size of the output feature map of the first layer.

Referring to FIGS. 22 through 24, after computing the first layer, the subsequent layer may have a different tiling scheme between the layers.

FIGS. 22 and 23 illustrate a case where the output feature maps 24_1, 25_1 of the first layer are vertically tiled and used as the input feature maps 24_2 of the subsequent layer, and FIG. 24 illustrates a case where the vertically tiled output feature maps 26_1 of the first layer are used as the input feature maps 26_2 of the subsequent layer.

FIG. 22 is a case where a swap of the output feature maps 4_1, 4_2 of the first layer is required, such that in the variable memory 24_3 for the first layer operation and in the variable memory 24_4 for the subsequent layer operation, at the location (or index) where the first output feature map 4_1 is stored among the output feature maps 4_1, 4_2 of the first layer, and the input feature map 5_2 corresponding to the second output feature map 4_2 of the other one of the output feature maps 24_1 of the first layer may be replaced. The output feature maps 24_1 of the vertically tiled first layer may include a first output feature map 4_1 and a second output feature map 4_2.

FIG. 23 shows a case where a move of the output feature maps 25_1 of the first layer is required, such that in the variable memory 24_3 for the first layer operation and the variable memory 24_4 for the subsequent layer operation, the location where the output feature maps 6_1 of the first layer are stored when they are stored as input feature maps 7_1 in the subsequent layer, may be changed.

FIG. 24 shows a case where a copy of the output feature map 26_1 of the first layer is required, such that in the variable memory 24_3 for the first layer operation and the variable memory 24_4 for the subsequent layer operation, the output feature map 8_1 of the first layer is copied in the subsequent layer, which may require twice the memory space. Exemplarily, the output feature maps 8_1 of the first layer may change where they are stored when they are copied and moved in the subsequent layer and stored as input feature maps 9_1 in the subsequent layer.

According to one example of the present disclosure, the layout of the output feature map stored in the variable memory may be changed due to a change in the threading method, and the space cost of the layout change, such as when the output feature map is swapped, moved, or copied, should be considered separately. A change in the layout of the output feature map may mean, for example, a change in the index(es) of the memory unit(s) stored by the swap or move, or a change in the number of memory unit(s) stored by the copy.

Accordingly, the neural processing unit including the variable memory of the present disclosure can improve the efficiency of each operation of the internal memory (i.e., the variable memory) and can avoid storing unnecessary data that is not used in the operation in one layer. Maximum storage efficiency can be achieved with minimal memory size, which can provide better caching performance. Further, by reusing feature maps in accordance with one example of the present disclosure, power consumption by the main memory can be minimized.

Further, by eliminating the need to inefficiently increase memory size in a neural processing unit comprising the variable memory of the present disclosure, manufacturing yields of ASIC chips can be increased. Furthermore, by optimizing the memory size, the power consumption of the neural processing unit may be reduced.

According to examples of the present disclosure, the neural processing unit may further comprise at least one processing element configured to generate an output feature map by performing a convolutional operation of the input feature map and weights, a direct memory access (DMA) circuitry element configured to control memory operations between the main memory and the variable memory, and an AI operation element configured to process an artificial neural network inference operation by receiving input feature maps and weights from the variable memory.

According to examples of the present disclosure, the neural processing unit may reuse the output feature map from the variable memory by machine code compiled by the at least one artificial neural network model. This approach results in greater power efficiency compared to conventional technologies that lack feature map reuse techniques.

According to examples of the present disclosure, the neural processing unit may reuse the output feature map of the variable memory by the machine code compiled by the at least one artificial neural network model, resulting in lower processing time for inference operations compared to conventional technologies that lack feature map reuse techniques.

The examples of the present disclosure shown herein and in the drawings are given for the purpose of illustrating the technical content of the present disclosure and to provide specific examples to facilitate understanding of the present disclosure, and are not intended to limit the scope of the disclosure. It will be apparent to one of ordinary skill in the art to which this disclosure belongs that other modifications based on the technical ideas of the invention may be practiced in addition to the examples disclosed herein.

[National research and development project that supported this invention]
[Assignment number] 1711193247
[Assignment number] 2022-0-00248-002
[Ministry Name] Ministry of Science and ICT
[Name of project management (professional) organization] Korea Information and Communication Planning and Evaluation Institute
[Research project name] PIM artificial intelligence semiconductor core technology development (design)
[Research project name] Development of CXL-based PIM semiconductor technology for multiple DRAM modules considering memory consistency
[Contribution rate] 1/1
[Name of project carrying out organization] DeepX Co., Ltd.
[Research period] 2023.01.01~2023.12.31

What is claimed is:

1. A method of reusing feature maps that is operable on a neural processing unit (NPU), the method comprising:
   (a) calculating, for a first layer of at least one artificial neural network (ANN) model including a plurality of layers, a space cost based on sizes of an input feature map, an output feature map, and a weight of a subsequent layer of the first layer;
   (b) calculating a caching value for an operation of the first layer;
   (c) determining a caching profit for the operation of the first layer based on the space cost and the caching value, the caching profit being cumulatively calculated per operation;
   (d) selecting at least one caching entry from among caching candidate entries, each of the caching candidate entries corresponding to an the output feature map used for computation in a particular layer among the plurality of layers;
   (e) determining a caching entry of the at least one caching entry having maximum caching profit among the at least one output feature map of the caching candidate entries, the caching entry with the maximum caching profit determined based on the cumulatively calculated caching profit; and
   (f) storing the caching entry in a variable memory including a plurality of memory units, by selectively storing the caching entry in at least one memory unit of the plurality of memory units to exclude unnecessary data among the at least one cache entry, the selective storing considering each layer between the first layer and a delta-step layer ($\Delta$-step layer), where $\Delta$ is an integer greater than or equal to two,
   wherein the method is executed by the NPU, the NPU including the at least one ANN model.

2. The method of claim 1,
   wherein the space cost is a number of buffers of the variable memory corresponding to a sum of a size of the output feature map of the first layer and the sizes of the output feature map and the weight of the subsequent layer, and
   wherein the number of buffers corresponds to a number of the plurality of memory units of the variable memory.

3. The method of claim 2, further comprising:
   performing layer operations using weights divided into at least two threads,
   wherein the space cost is calculated based on a tiling method of the first layer,
   wherein the tiling method of the first layer comprises at least one of copy, swap, or move, and
   wherein the space cost is calculated based on a tiling method of a particular layer of the layer operations, the tiling method of the particular layer being different from the tiling method of the first layer.

4. The method of claim 1, wherein the caching value is a size of data corresponding to a performance profit obtained when the output feature map of the first layer is stored in the variable memory.

5. The method of claim 1, wherein the caching entry is determined based on sizes of the input feature map and the output feature map of each layer in the caching candidate entries.

6. The method of claim 1,
   wherein the space cost is calculated as being not greater than a size of the variable memory, and
   wherein the caching profit of the operation of the first layer is determined by the larger value of:
   a first caching profit when the output feature map of the first layer is stored in the variable memory and
   a second caching profit when the output feature map of the first layer is not stored in the variable memory.

7. The method of claim 1,
   wherein the space cost is calculated as being greater than the size of the variable memory, and
   wherein the caching profit of the operation of the first layer is determined by the caching profit when the output feature map of the first layer is not stored in the variable memory.

8. The method of claim 7, wherein the caching profit is determined for each layer included in the at least one ANN model.

9. A system including a neural processing unit, the system comprising:
   a main memory configured to store at least a portion of data of at least one artificial neural network (ANN) model including a plurality of layers;
   a variable memory configured to selectively store a caching entry of the at least a portion of the data of the at least one ANN model in at least one memory unit of a plurality of memory units; and
   a controller configured to:
      calculate, for a first layer of the at least one ANN model, a space cost based on sizes of an input feature map, an output feature map, and a weight for each layer within a delta-step layer ($\Delta$-step layer), where $\Delta$ is an integer greater than or equal to two,
      calculate a caching value for an operation of the first layer,
      determine a caching profit for the operation of the first layer based on the space cost and the caching value, the caching profit being cumulatively calculated per operation,
      select at least one caching entry from among caching candidate entries, each of the caching candidate entries corresponding to an output feature map used for computation in a particular layer among the plurality of layers; and
      determine a caching entry of the at least one caching entry having maximum caching profit among the at least one output feature map of the caching candidate entries, the caching entry with the maximum caching profit determined based on the cumulatively calculated caching profit,
   wherein each of the at least one caching entry is selected based on a computational order held by the particular layer of the plurality of layers and on the sizes of the input feature map and the output feature map of each layer in the caching candidate entries.

10. The system of claim 9, wherein a path between the first layer and the delta-step layer includes $\Delta-1$ layers.

11. The system of claim 9,
    wherein the space cost is a number of buffers of the variable memory corresponding to a sum of a size of the output feature map of the first layer and the sizes of the output feature map and the weight of the subsequent layer, and
    wherein the number of buffers corresponds to a number of the plurality of memory units of the variable memory.

12. The system of claim 11, wherein the caching value is a size of data corresponding to a performance profit obtained when the output feature map of the first layer is stored in the variable memory.

13. The system of claim 9, wherein the controller is further configured to determine the caching entry among the caching candidate entries using a dynamic programming-based algorithm.

14. The system of claim 9, further comprising:
a direct memory access (DMA) circuitry configured to control memory operations between the main memory and the variable memory; and
an artificial intelligence (AI) compute unit configured to process an artificial neural network inference operation by receiving the input feature map and the weight from the variable memory.

15. The system of claim 9, further comprising:
at least one processing element configured to perform a convolutional operation on the input feature map and the weight.

16. The system of claim 9, wherein the output feature map of the variable memory is reused by a machine code in which the at least one ANN model is compiled to reduce power consumption of the system.

17. The system of claim 9, wherein the output feature map of the variable memory is reused by a machine code in which the at least one ANN model is compiled to reduce inference operation processing time of the system.

* * * * *